United States Patent
Suryadi et al.

(10) Patent No.: US 12,432,540 B2
(45) Date of Patent: Sep. 30, 2025

(54) SYSTEM AND METHOD FOR INTRODUCING A NEW EMERGENCY ALERT USING MODULAR TAG DEVICE

(71) Applicant: Samsung Electronics Co., Ltd., Suwon-si (KR)

(72) Inventors: Tandri Suryadi, Jakarta (ID); Kautsar Assyifa Baroroh Pramas, Jakarta (ID); Kevin Winata, Jakarta (ID); Yanuar Rahman, Jakarta (ID); Andri Setiawan, Jakarta (ID); Albertus Dio Padmadharma, Jakarta (ID); Amri Shodiq, Jakarta (ID); Leonardus Ardyandhita Kurniawan Suwardhanis, Jakarta (ID)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 17/983,750

(22) Filed: Nov. 9, 2022

(65) Prior Publication Data

US 2023/0209321 A1    Jun. 29, 2023

Related U.S. Application Data

(63) Continuation of application No. PCT/KR2022/015858, filed on Oct. 18, 2022.

(30) Foreign Application Priority Data

Dec. 23, 2021    (ID) .............................. P00202112005

(51) Int. Cl.
*H04W 4/90* (2018.01)
*H04W 4/029* (2018.01)
(Continued)

(52) U.S. Cl.
CPC ............. *H04W 4/90* (2018.02); *H04W 4/029* (2018.02); *H04W 4/12* (2013.01); *H04W 4/38* (2018.02); *H04W 84/18* (2013.01)

(58) Field of Classification Search
CPC ......... H04W 4/12; H04W 4/029; H04W 4/90; H04W 4/08; H04W 84/18; H04W 4/38;
(Continued)

(56) References Cited

U.S. PATENT DOCUMENTS 8,400,268 B1 * 3/2013 Malik ................ G08B 13/1427
340/8.1
9,788,257 B2    10/2017 Singh et al.
(Continued)

FOREIGN PATENT DOCUMENTS

EP    2 898 822 A1    7/2015
EP    2 999 297 A2    3/2016
(Continued)

OTHER PUBLICATIONS

International Search Report dated Jan. 26, 2023, issued in International Patent Application No. PCT/KR2022/015858.
(Continued)

*Primary Examiner* — Congvan Tran
(74) *Attorney, Agent, or Firm* — Jefferson IP Law, LLP

(57) ABSTRACT

A system and method to utilize modular device and mesh network to send emergency alert that could be delivered to the cloud and sent to the user even though the cloud itself is not reachable directly from the device are provided. The disclosure uses modular sensors, internet of things (IoT) application and cloud server, and an emergency protocol that may enable devices within the mesh network to find the best route to cloud and produce reliable emergency alert even though the connection between device and cloud is unreliable.

12 Claims, 43 Drawing Sheets

(51) Int. Cl.
*H04W 4/12* (2009.01)
*H04W 4/38* (2018.01)
*H04W 84/18* (2009.01)

(58) Field of Classification Search
CPC ...... G08B 25/016; G08B 25/10; G16Y 20/10; G16Y 40/50
See application file for complete search history.

(56) References Cited

U.S. PATENT DOCUMENTS

| | | | |
|---|---|---|---|
| 9,911,296 | B2 | 3/2018 | Luke et al. |
| 10,182,327 | B2 | 1/2019 | Kwon et al. |
| 10,912,056 | B2 | 2/2021 | Eisner |
| 2008/0070546 | A1 | 3/2008 | Lee |
| 2012/0056741 | A1* | 3/2012 | Zhu .................. G08B 21/0261 340/539.12 |
| 2016/0261458 | A1* | 9/2016 | Huang ................ H04L 43/0817 |
| 2016/0379464 | A1* | 12/2016 | Sedayao ............ G08B 21/0236 340/686.6 |
| 2017/0017815 | A1* | 1/2017 | Caso ....................... G06F 21/35 |
| 2017/0280687 | A1* | 10/2017 | Vrabete ................ A01K 29/005 |
| 2019/0132656 | A1 | 5/2019 | Struhsaker |
| 2019/0364492 | A1* | 11/2019 | Azizi .................... H04W 4/024 |
| 2019/0380311 | A1* | 12/2019 | Crouthamel ......... A01K 11/004 |
| 2020/0124695 | A1 | 4/2020 | Guo et al. |
| 2020/0252780 | A1 | 8/2020 | McClendon, IV et al. |
| 2020/0351623 | A1 | 11/2020 | Eisner |
| 2020/0364525 | A1 | 11/2020 | Mats et al. |
| 2021/0084480 | A1* | 3/2021 | Maier ..................... H04W 4/90 |
| 2021/0090426 | A1 | 3/2021 | Gandhi et al. |
| 2021/0160658 | A1* | 5/2021 | Mars ..................... H04L 9/3213 |
| 2021/0194760 | A1 | 6/2021 | Barton et al. |

FOREIGN PATENT DOCUMENTS

| | | |
|---|---|---|
| JP | 2020-524266 A | 8/2020 |
| KR | 10-2008-0020728 A | 3/2008 |
| WO | 2014/191960 A1 | 12/2014 |
| WO | 2016/153278 A1 | 9/2016 |

OTHER PUBLICATIONS

Extended European Search Report dated Feb. 17, 2025, issued in European Application No. 22911556.3.

* cited by examiner

Smart Tag mesh network

SYSTEM AND METHOD FOR INTRODUCING A NEW EMERGENCY ALERT USING MODULAR TAG DEVICE

CROSS-REFERENCE TO RELATED APPLICATION(S)

This application is a continuation application, claiming priority under § 365(c), of an International application No. PCT/KR2022/015858, filed on Oct. 18, 2022, which is based on and claims the benefit of an Indonesian patent application number P00202112005, filed Dec. 23, 2021, in the Indonesian Intellectual Property Office, the disclosure of which is incorporated by reference herein in its entirety.

BACKGROUND

1. Field

The disclosure relates to a novel method for emergency alert that make use of modular TAG device. More particularly, the disclosure relates to a system and method that have the advantage that the emergency alert could be delivered to the cloud and sent to the user even though the cloud itself is not reachable directly from the TAG device, by using the mesh network between devices to find the best route to the cloud. As a result, the system and method could produce reliable emergency alert with unreliable device-cloud connection.

2. Description of Related Art

Currently, Tag devices are very simple and limited in terms of user interaction, therefore limiting the information that can be sent in an alert message in case of emergencies. This, in turn may also make it hard to formulate proper and effective response to the emergency, because the receivers of the alert have no way to know what exactly happened or even the type of said emergency. If Tag devices may be equipped with various sensors or microphone for voice, the potential messages that may be sent from it may improve drastically in terms of quality and information density. However, equipping the Tag devices with sensors or other equipment may prove difficult since the Tag devices are manufactured and sold as is, with no support for extensions or additional hardware accessories. To extend the Tag device functionality, a modular approach may be needed, where users may either choose prepackaged Tags with various functionality or acquire additional external modules themselves.

Another issue that may happen in using the Tag device in case of emergency is connectivity. When trying to send messages, currently the Tag devices needs to either be connected with an owner's smartphone, or other a user's smartphone in case the Tag device has lost connection with its owner. But, there are cases where the Tag device cannot find either of them, usually in remote places, which is problematic because a lot of emergencies do happen in those kind of areas. Any improvement in this regard may be very helpful in reducing the cases where alert messages cannot be sent. Also, there may be some cases where the owner is not immediately available. In this case, they may want to set the alert to be also sent either to their families and friends, or nearby people. The control over this is missing from current Tag device implementations.

The goal of the disclosure is to provide solutions to the problems listed before. The limitation and inflexibility of the Tag devices are tackled by the proposed modular sensor hardware approach, while connectivity issues may be dealt by implementing the proposed Tag protocol. The disclosure may also describe the components needed to support those solutions, and link both of them together as a comprehensive system for improved Tag device usage.

There are already several patents that explore various methods for mesh networking using different kinds of wireless communication technology and methods to build modular sensors in a wearable device. However, none of the disclosures discussed a method on how to leverage all of those topics to build an emergency system that utilizes the Tag devices as the source of the emergency trigger.

According to the inventors' knowledge there is no patent or public paper yet providing such an integrated emergency system that utilizes peer-to-peer mesh networking to solve the device-cloud-connection problems and modular sensors solution to achieve different kinds of sensor module support within the Tag device.

A first Prior Art is U.S. Pat. No. 9,788,257B2 that discloses a method of dynamically forming a service aware Bluetooth low energy (BLE) mesh network. The method includes deriving service requirements for a BLE mesh service based on a unique identifier associated with the BLE mesh service, determining a BLE mesh service to be provided based on at least one BLE parameter, and dynamically forming a BLE mesh network based on the determined BLE mesh service, the service requirements and the at least one BLE parameter. The BLE mesh network is one of connection-oriented, or connection-less. Meanwhile, the purpose of the current disclosure is to present a method to form a mesh network that is also protocol-agnostic. In the current disclosure the wireless communication protocols are not limited to Bluetooth Low Energy only. The role of the node in the mesh network is also decided by its state, whether it is in emergency mode or in standby mode.

A second Prior Art is EP2999297A3 that discloses a system for facilitating communications in a mesh network. One or more devices of the mesh network may participate as routing nodes to provide range extension for any other devices in the mesh network that would otherwise be out of range from one another. In one or more implementations, Bluetooth Low Energy (BLE) may be used as the physical transport of the mesh network. While the current disclosure treats the others mesh node like smartphone, as the non-routing node and use the smartphone as the communication path to the cloud service. The current disclosure utilizes a mesh network to find the nearest node with the capability of communicating with the Cloud, a node that is connected to a device like a smartphone with the client app installed.

A third Prior Art is Patent WO2016153278A1 that discloses a method and device for setting the role of a device in a Bluetooth mesh network. According to the current disclosure, a method and device are provided which: receive a write request message including settings information for setting the role of a first device from a control device; transmit a response message as a response to the write request; transmit an advertising message including role information set by the settings information to a second device; and transmit a first message including first information on the first device to the second device. The current disclosure uses a different packet format in the communication protocol between the mesh node. Another aspect that the current disclosure tries to achieve is to communicate with the cloud from the nearest smartphone that is paired and connected to the Tag device in the mesh network.

A fourth Prior Art is Patent EP2898822A1 that discloses systems and methods to construct a modular sensor platform in wearable device, e.g., Smart Watch. In this embodiment, the main idea is to utilize removable modular sensing circuitry (sensor array), connected with the sensor computing unit to perform computation on the sensor data. The modular sensing circuitry meant to support both replacement and addition of sensor functionality outside the manufacturing process. While the current disclosure is to uniquely identify each sensor hardware type using an embedded identifier (ID) and have a Universal Bridge Interface to connect the sensor module and the embedded application. Such that, an embedded application can automatically recognize what is the type of the sensor module that is currently attached to a particular connector pin.

A fifth Prior Art is Patent WO2014191960A1 that describes a method for motion and position-sensing with the main focus in environmental dosimetry (radiation sensor) using sensors in a wearable device. The modular sensors are integrated on a single chip or electronic board (e.g., printed circuit board (PCB)), thus forming an integrated sensor module (sensor package) using a sensor array, matrix, or in the form of (solid-state) sensor array to integrate multiple sensor. While the current disclosure is focused on how to make the sensor module integration in a modular way by using a unique sensor type identifier (ID) and a universal bridge interface, which then provide a standard interface for interaction between the embedded application and the sensor module. In the proposed disclosure, the form factor of the sensor module is not limited to a sensor array or matrix only.

Most of the foregoing references above only focus on providing some part of the disclosure. Whereas, the disclosure proposes a novel method for emergency alert that make use of modular TAG device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a novel method for emergency alert that make use of the Tag devices. We propose addition to Tag hardware in the form of modules and communication protocol between the Tags devices in the pursuit of better alert management and help increase the chances of emergency situation being resolved. Overall improvements to several steps in the process, from when the Tag device is onboarded and set up to when the emergency happened and alerts must be sent, are also included.

Another aspect of the disclosure is to provide a hardware module for the Tag device, such as voice recognition and motion sensor for increasing the option available when initiating emergencies and asking for help, especially when simple button press patterns aren't available or not descriptive enough for the alert. To support the integration of hardware modules for the Tag device, the disclosure also describes the needed software in the device itself, owner's mobile phone and the cloud server.

Another aspect of the disclosure, to improve the chances of emergencies being correctly alerted to as much relevant people, be it the owner, their friends or other user in close vicinity, is to provide a Tag Emergency protocol that utilizes a MESH network between other Tag devices. When a mobile phone that may send alerts to the cloud is unreachable by the Tag in emergency with normal means, using this protocol enables that Tag device to communicate with other nearby Tag devices and create a message relay to eventually reach the cloud.

Additional aspects will be set forth in part in the description which follows and, in part, will be apparent from the description, or may be learned by practice of the presented embodiments.

The disclosure has four main features, which are better than conventional scheme, to wit:

Firstly, the disclosure may register owner's device(s) and create a group of trusted people using the internet of things (IoT) client application, by:
  Pairing devices to register owner identification on IoT client application
  Recognizing the sensors attached on the Tag device or other devices, and detecting its capabilities
  Verifying the physical ownership of devices to ensure that the owner has access to physically control the device
  Registering selected contacts into Close Friend group, called as circle
  Requesting for approval to the selected contacts to be added in the circle
  Initiating installation of IoT client application for selected contacts that are still unregistered to the IoT service Secondly, the disclosure may utilize modular sensor stack to trigger emergency alert, by:
  Identifying and registering the types of sensor modules attached on the Tag device or other devices
  Initiating Emergency mode when a trigger is received, such as a pressed button
  Sending START command to trigger data acquisition and encoding from sensor module
  Starting data acquisition to process and encode the data according to the type of sensors
  Sending STOP command to stop data acquisition once the data is sufficient Thirdly, the disclosure may use wireless a mesh network to propagate the emergency alert, by:
  Using the flooding and routing mechanisms of the mesh network for transferring data and sending commands
  Combining the use of flooding and routing mechanisms to handle the emergency alert within the mesh network
  Applying both flooding and routing mechanisms to other devices, i.e., not limited only to BLE Fourthly, the disclosure may use Emergency Tag Protocol to extend the communication of the Tag devices, by:
  Dictating the behavior of devices and network packets for emergency situation that involves the Tag devices and applicable on top of network communication stack
  Categorizing devices into four aspects, which are emergency device, helper device, end device, and cloud
  Transmitting alert messages from emergency devices to end devices by flooding the network with request, and sending the data once the request has been responded by either helper or end devices Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
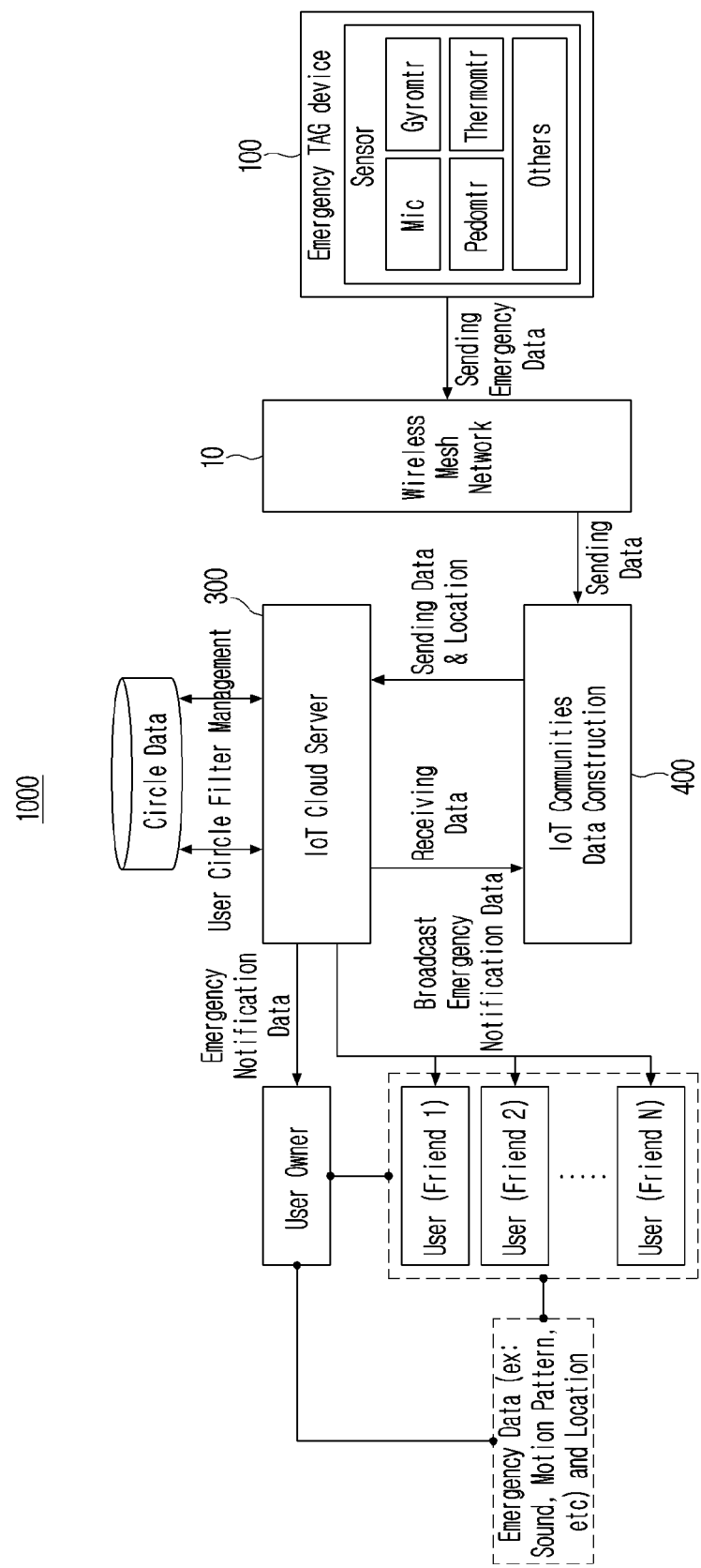
FIG. 1 is a general overview of the disclosure for emergency alert using modular tag devices according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms including ordinals, such as first, second, etc., may be used to describe various elements, but such elements are not limited to the above terms. The above terms are used only for the purpose of distinguishing one component from another.

The expression such as "comprise" or "have" as used herein is intended to designate existence of a characteristic, number, step, operation, element, part or a combination thereof as specified in the description, and should not be construed as foreclosing possible existence or addition of one or more of the other characteristics, numbers, steps, operations, elements, parts or a combination thereof. It is to be understood that when an element is referred to as being "connected" or "accessed" to another element, it may be directly connected or accessed to the other element, but it should be understood that there may be other components in between. When an element is referred to as being "directly connected" or "directly accessed" to another element, it should be understood that there are no other elements in between.

Meanwhile, as used herein, a "module" or "unit" for an element performs at least one function or operation. In addition, a "module" or "unit" may perform a function or operation by hardware, software, or a combination of hardware and software. In addition, a plurality of "modules" or a plurality of "units" other than a "module" or "unit" to be performed in specific hardware or to be executed in at least one processor may be integrated into at least one module. Singular forms are intended to include plural forms unless the context clearly indicates otherwise.

In the description of the disclosure, the order of each step should be understood as non-limiting unless a preceding step is to be logically and temporally performed before a subsequent step. In other words, except for exceptional cases described above, even if the process described as a subsequent step is performed before the process described as the preceding step, an essence of the disclosure is not affected, and the scope of the disclosure should also be defined regardless of the order of the steps. In addition, in the disclosure, "A or B" is defined as meaning not only selectively pointing to any one of A and B, but also including both A and B. In addition, in the disclosure, the term "include" has the meaning of encompassing the inclusion of other components in addition to elements listed as being included.

In the disclosure, only essential elements necessary for the description of the disclosure are described, and elements not related to an essence of the disclosure are not described. In addition, it should not be construed in an exclusive meaning including only the described components, but should be interpreted in a non-exclusive meaning that may also include other elements.

In describing example embodiments, detailed description of relevant known functions or components may be omitted if it would obscure the description of the subject matter. Meanwhile, each embodiment may be implemented or operated independently, but each embodiment may be implemented or operated in combination.

Preferred embodiments and their advantages are best understood by reference to FIGS. 1 to 16, 17A and 17B, 18 to 25, 26A and 26B, 27A and 27B, and 28 to 40. Accordingly, it is to be understood that the embodiments of the disclosure herein described are merely illustrative of the application of the principles of the disclosure. Reference herein to details of the illustrated embodiments is not intended to limit the scope of the claims, which themselves recite those features regarded as essential to the disclosure.

FIG. 1 is a general overview of a disclosure for an emergency alert using modular tag devices according to an embodiment of the disclosure.

Referring to FIG. 1, it describes a general overview of emergency alert system 1000 using modular tag devices. There are several elements involved in the implementation of this emergency alert system. The first is the Emergency TAG device (100) that has the modular sensor on it, hereinafter referred to as a Lost TAG device. The modular sensor on the Lost Tag device may provide a more flexible choice for a user's needs and the ability to expand the capability of a single TAG device. The TAG device may act as the node that form the Wireless Mesh Network 10 and also as the source of an emergency alert itself. Since the data transmission from the Wireless Mesh Network 10 to an end device in the IoT Communities (400) may be made in the form of multiple packets (chunks) of data, the data reassembly may take place in the end device before the data transmission to the IoT cloud server (300) started. The IoT cloud server (300) may know which user should be notified by this emergency alert by referring to the source device in emergency message and the configuration in the Circle Data. For the Emergency TAG device (100) to be mapped to some specific users to receive the emergency notice, this may be covered in the Device Pairing & Recognition process that performed in the IoT Client App.

Figure 2:
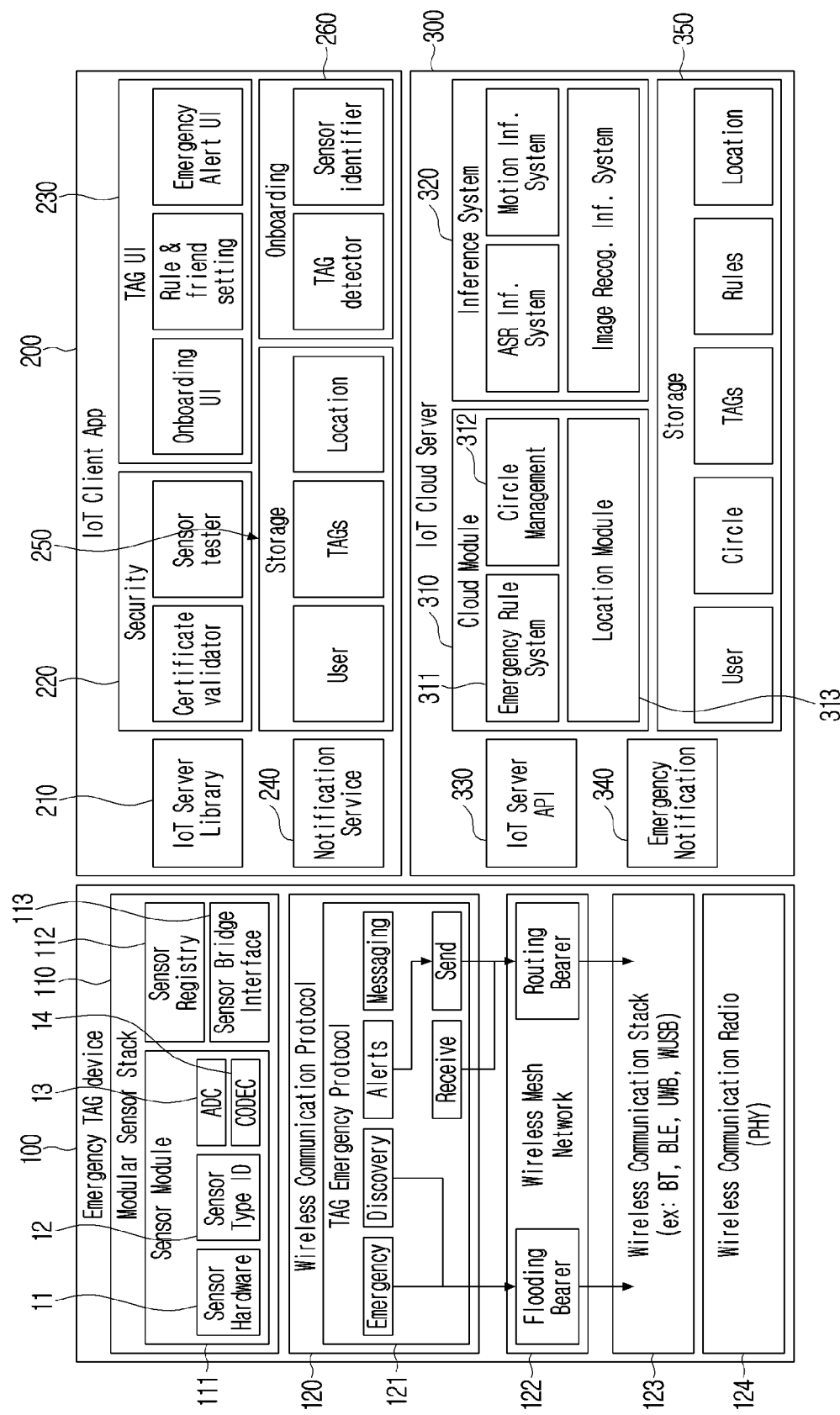
FIG. 2 is an architecture stack for an emergency alert system according to an embodiment of the disclosure.

FIG. 2 is an architecture stack for an emergency alert system according to an embodiment of the disclosure.

Referring to FIG. 2, it describes an architecture stack of modules used in the disclosure. There are three main blocks in the proposed disclosure. The first is the Emergency TAG device (100) that contains a Modular Sensor Stack (110), a Wireless Communication Protocol Module (120), a Wireless Mesh Network (122), a Wireless Communication Stack (123), and a Wireless Communication Radio module (124). The disclosure may utilize Modular Sensor Stack (110) which may be used to receive the data point from the nearby environment or from the user action, such as moving the Tag device or by pressing a specific button on the Tag device. The Modular Sensor Stack (110) also contains Sensor Registry (112) & Sensor Bridge Interface (113) submodules that are needed for the sensor digital address mapping and to facilitate the communication between the software and a sensor module (111). The Wireless Communication Protocol Module (120) comprises of several submodules, including a Tag Emergency Protocol (121), that are related to the system & method for mesh networking in the disclosure. The disclosure provides a methodology to work with current state of the art protocol to compose an emergency system that utilize mesh networking to reach the IoT cloud server (300) when it is needed and direct connection to the nearest IoT Client App is not possible.

The second main block is the IoT Client App stack. In the disclosure, the IoT Client App (200) is responsible for the Emergency Tag device (100) onboarding, pairing, and recognition. The device owner may be able to onboard their Emergency Tag device (100) in a guided manner, starting from checking the sensor that is attached in the Emergency Tag device (100), setting up the emergency trigger, and assign the alert recipient when the emergency alert from specific device is being triggered. The IoT Client App (200) may include an IoT Library (210), a Certificate Validator (220), a Tag User Interface (UI) (230), a Notification Service (240), a Storage (250) and a Sensor Identifier (260).

The third main block is the IoT cloud server (300). The main scopes in this stack are Cloud Module (310) and Inference System (320). The Cloud Module (310) contains several submodules that are required for handling emergency alerts coming from the mesh network. The Emergency Rule System (311) is responsible to make the proper association between emergency alert and specific group of user, hereinafter referred to as circle, that are managed by Circle Management module (312). The inference system (320) and its submodules are there to handle incoming request from mesh network with sensor data from Emergency Tag device (100) and check for the matching emergency pattern, in case of the matching pattern found, the Cloud Module (310) may be notified and the emergency notification may be sent to specific user(s).

Figure 3:
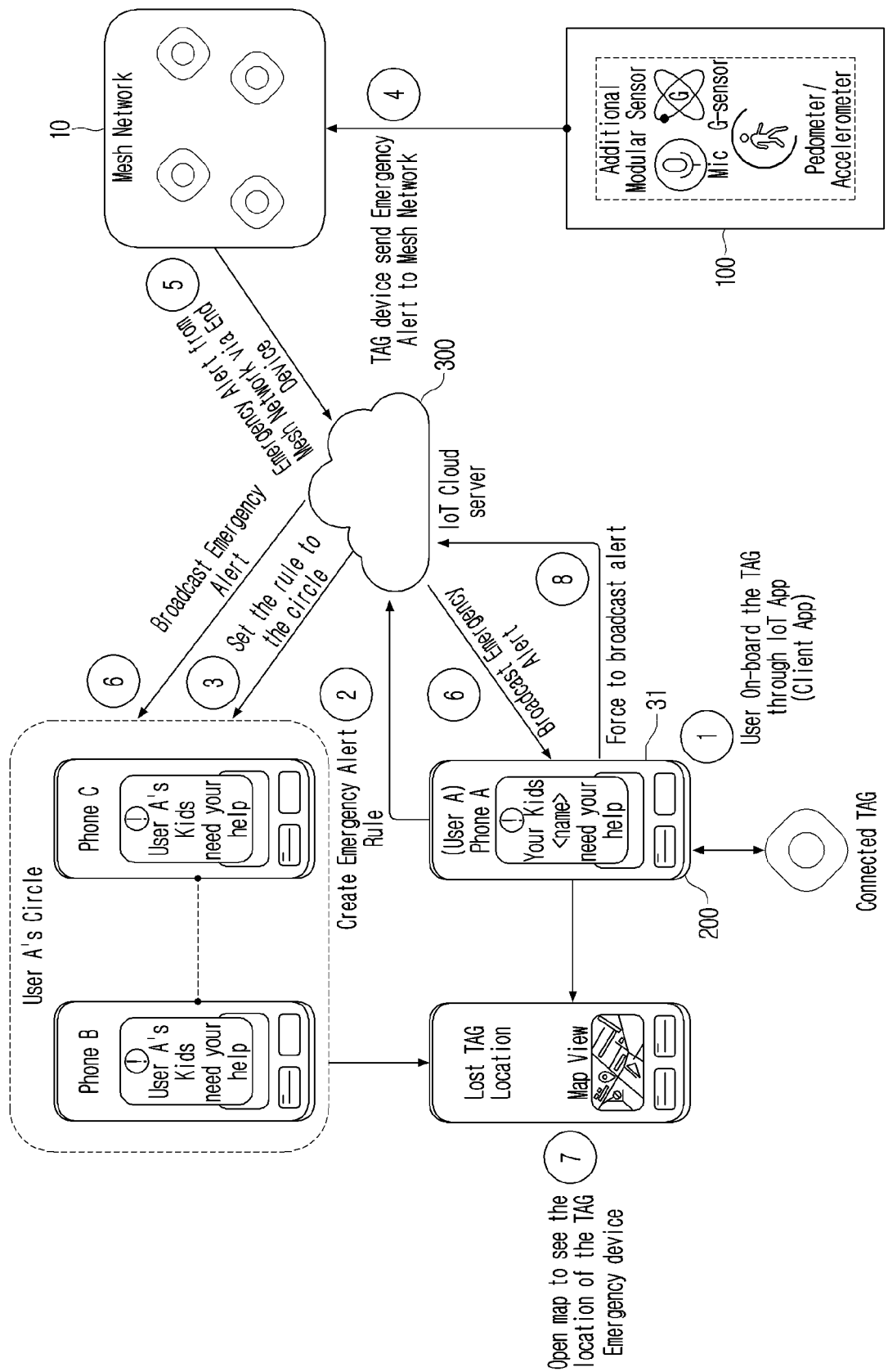
FIG. 3 is a general workflow of an emergency alert using a modular tag according to an embodiment of the disclosure.

FIG. 3 is a general workflow of an emergency alert using a modular tag according to an embodiment of the disclosure.

Referring to FIG. 3, it describes the general workflow of Emergency Alert using Modular Tag devices. The process may generally be divided into two parts. The first is the onboarding and setting part. In this part, user may need to onboard their new Tag with their phone (31) with the client app. By doing this, the Tag may know its owner account and be registered to the cloud as such. The onboarding process is usually standardized between each manufacturer and depends on the device hardware capabilities, such as having Wi-Fi module or screen that can show text or quick response (QR) code. Tags onboarding process is generally using either Bluetooth Low Energy (BLE) or Ultra-wideband (UWB) and the process involves pressing hardware button according to instruction on client app. With the proposed introduction of hardware modules in the disclosure, the onboarding may also support additional processes according to its module capability. For example, if the Tag uses a voice module, in the onboarding process the user may also need to provide voice samples that may be recognized by the Tag and matched in the client app.

The disclosure also proposes an additional process that the user can do after onboarding is successful, which is the setting process. This involves setting up rules and close friends in the client app, and may be sent to and saved on the cloud. By setting this, the user may control who to contact or ask for help when the emergency alert appears. They may also set custom messages for the alert based on which contact is it.

The next part is when the emergency alert happens. The first stage is when the Tag receives input. This input may differ based on what hardware module is installed. The Tag may be responsible of processing the input, then decide whether it is an emergency and send the alert. To process the input, the Tag may need to be equipped with proper software, such as codec or converter.

To facilitate better emergency handling and making sure the alert can be sent, the disclosure introduces the MESH network. This may help the Tag reach and send message in condition where it can't easily find end device, which is mobile device with client app, by utilizing other Tags in the vicinity and propagate the message between them. To enable the Tag use this feature, we also propose a new protocol called a Tag Emergency Protocol. This protocol may set a standard for communication and dictate the action done between the Tag with emergency, other helper Tags in the mesh, and end device in case of emergency.

After the alert is received by an end device, it may be sent to the cloud. As such, additional services and modules to the server side are also proposed. The server need to have additional application programming interfaces (APIs) for sending and receiving new types of alert from the Tag and a notification service with capability for sending emergency alerts. Other modules include inference engine for processing media and other supported alerts, and module that handle rule, friend circle and location to decide who to send alerts to.

Referring to FIGS. 4 to 8, they describe the various use cases in which the disclosure may be implemented. The disclosure can be used to help send emergency alerts in situation where it's hard or impossible otherwise. By utilizing different kind of hardware modules, it is also possible to send alerts that are more meaningful and rich in information, and the ones that received it may use that advantage to formulate better emergency response. There are six different use cases that the disclosure may be applied to.

Figure 4:
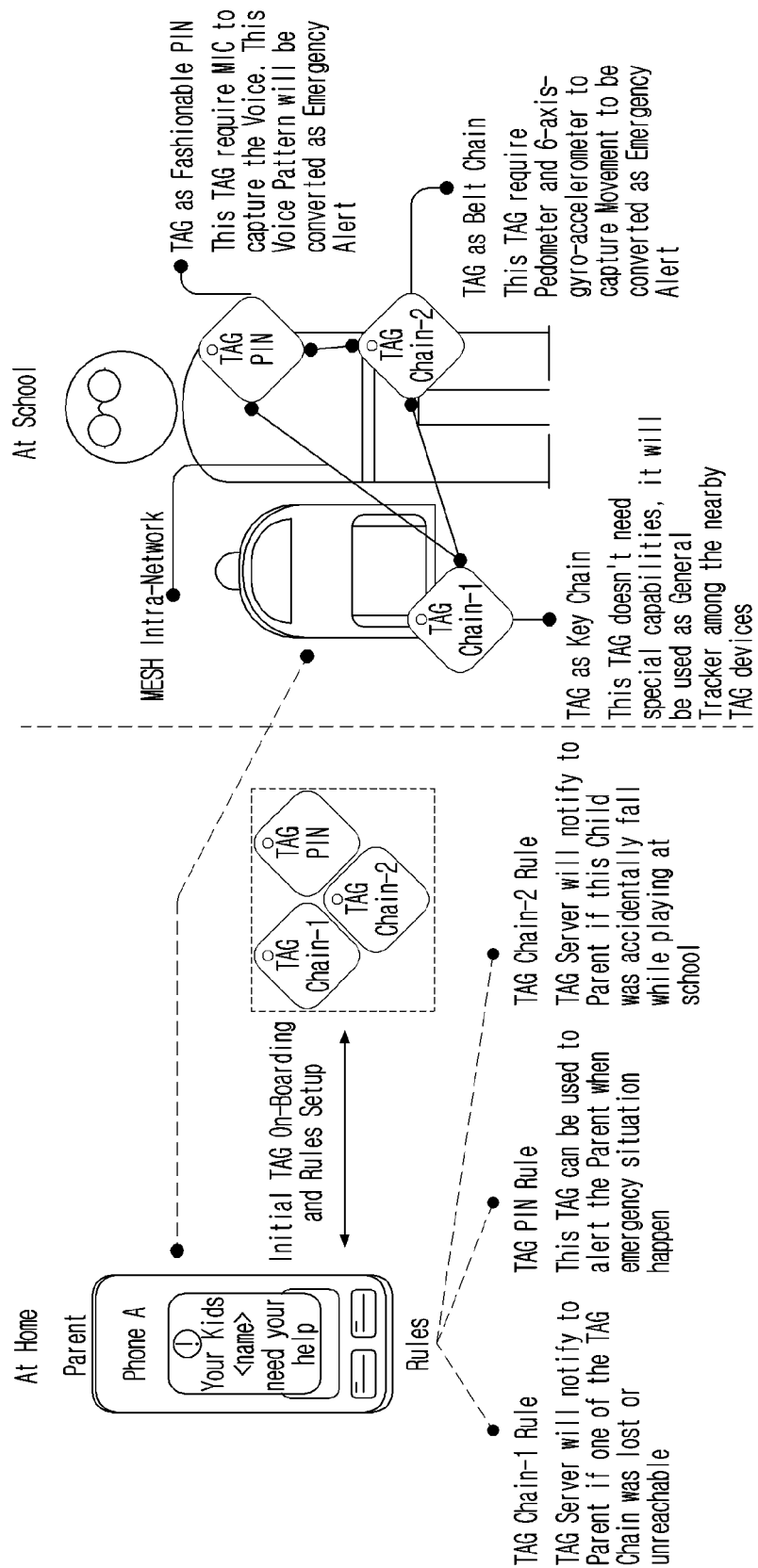
FIG. 4 is a sample use case scenario for child kidnapping emergency response according to an embodiment of the disclosure.

FIG. 4 is a sample use case scenario for a child kidnapping emergency response according to an embodiment of the disclosure.

Referring to FIG. 4, it describes the user scenario of Emergency Alert using Modular Tag Device for child kidnapping emergency response. As a precaution, a parent can use normal Tags to be attached to their child so they may locate the child or receive distress signal in the form of button presses. But in some case, such as kidnapping, there's some situation where the Tag attached to the child may not be helpful, for example when the child is restrained in such a way so they cannot press buttons, and taken to a location where the Tag can't be located or sent alerts. With the disclosure, the Tag and its supporting infrastructures have been improved so that it can have more chances to recognize distress and send alerts to the parents. As described on FIG. 4, illustrates the setup that a parent, as the owner of the Tag, can use to equip their child. The Tag is attached with motion sensor modules and has detection rules for abnormal movement, so it may send alert when it detects emergencies, such as falling down or unsafe acceleration. The parent also may set up some rules, dictating who else to call in case of emergencies, or what other condition to send alerts.

When the emergency actually happens, for example the child is taken away and the Tag lost connection, the area in which the Tag may still send alert messages is improved due to tag mesh network. This may be very helpful when predicting the direction and locating the child. Since content of the alert is also improved where the motion data of the Tag is included, it may also be used to infer what actually happened, for example if the child is thrown in and move with the speed of a car. With the rule previously set, authorities and other relatives of the parent can also be notified in case the parent is currently not immediately available. These improvements hopefully can save and better protect the children.

Figure 5:
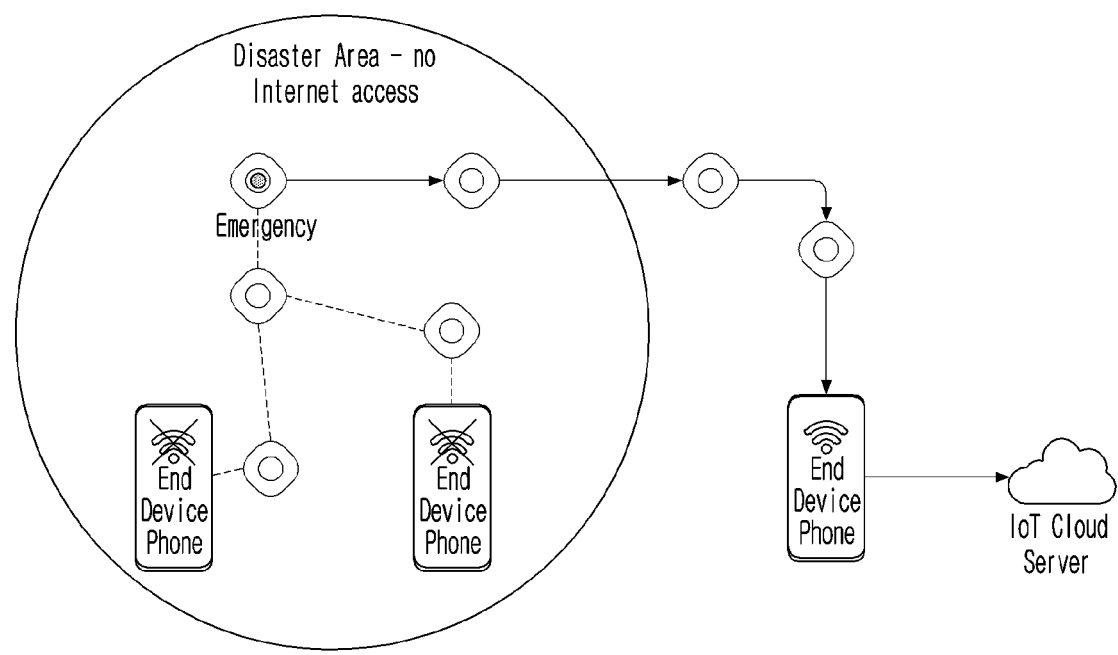
FIG. 5 is a sample use case scenario for a natural disaster according to an embodiment of the disclosure.

FIG. 5 is a sample use case scenario for a natural disaster according to an embodiment of the disclosure.

Referring to FIG. 5, it describes the use case scenario for emergency alert using modular Tag devices for natural disaster. In natural disaster events, such as earthquakes, tsunamis or other similarly devastating events, the Tag devices should be helpful to locate trapped or injured victims that have the Tag with them. Usually, communication may be heavily obstructed when any kind of natural disaster happens. Because of that, the Tag devices that are out of the reach of any remaining mobile phone with internet connection may fail to be located. With the mesh network and the protocol that the disclosure provides, such cases can be avoided.

Referring to FIG. 5, there are other devices in the proximity of a victim's Tag, such as other Tags or beacons. The disclosure may help propagate the emergency message even though those devices are not connected to the internet. The system may retrieve a precise location by using triangulation so it may locate the victim better when position of the helping device is known.

Figure 6:
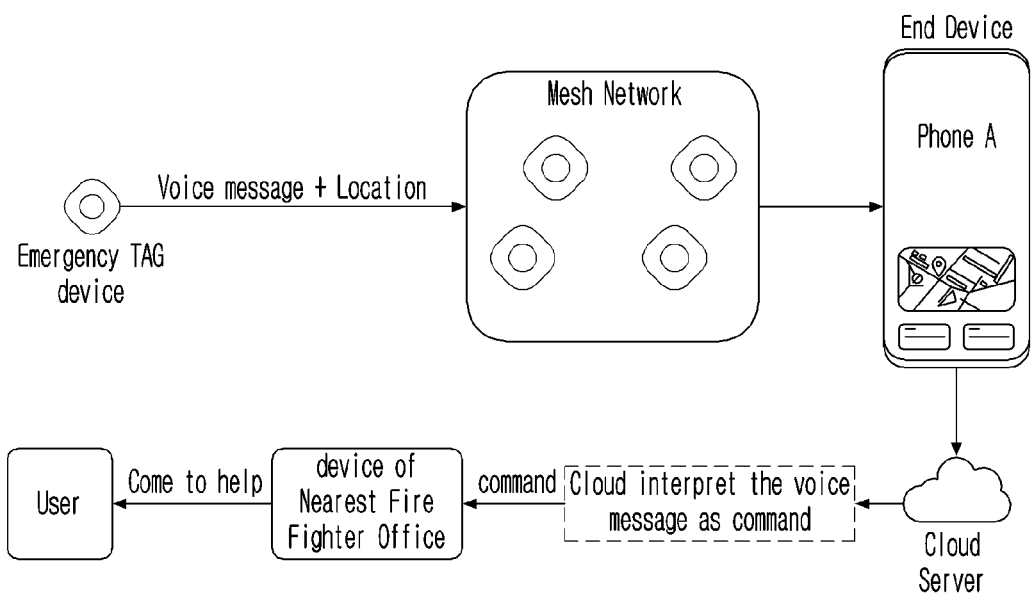
FIG. 6 is a sample use case scenario for a fire emergency response according to an embodiment of the disclosure.

FIG. 6 is a sample use case scenario for a fire emergency response according to an embodiment of the disclosure.

Referring to FIG. 6, it describes the use case scenario for emergency alert using modular Tag devices for fire emergency response. When there is a fire emergency, people tend to panic and it makes it difficult to get their phone and call for emergency. However, the disclosure makes it possible for people to call the nearest firefighter for help easily using the Tag devices. As shown in FIG. 6, it shows the general flow when using the Tag device to alert the nearest fire department. In case when user cannot press button to interact, the Tag device with motion sensor modules has detection rules for abnormal movement. When it detects emergency, the user may interact with the Tag device by sending a voice message or other words to trigger the emergency alert system. The system may include the location coordinates with the voice message, and it may be sent to the mesh network and it may be retrieved by cloud. The cloud server may recognize the voice message and interpret it as a command. This command may be used to find the device of the nearest firefighter from the user's location coordinates and may alert the firefighter to rescue the user.

Figure 7:
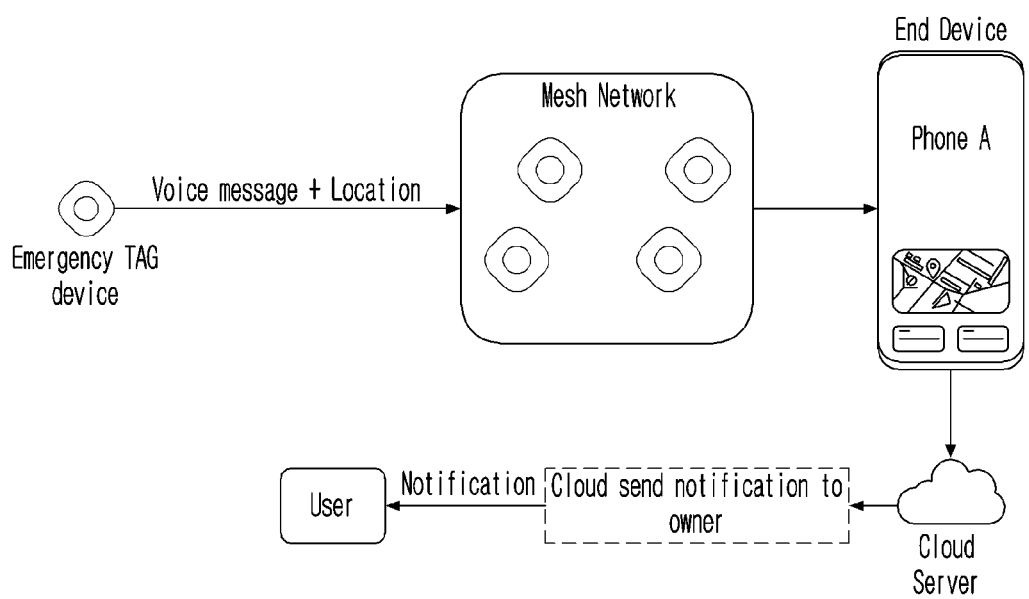
FIG. 7 is a sample use case scenario for a lost and found memo according to an embodiment of the disclosure.

FIG. 7 is a sample use case scenario for a lost and found memo according to an embodiment of the disclosure.

Referring to FIG. 7, it describes the use case scenario for emergency alert using a modular Tag device for sending a lost and found memo. When the Tag device is lost, and then found by another person, that person may send a message through the Tag device. For example, when a user lost the Tag device at the Train Station and it was found by someone else, the founder could leave a message such as "I found this, and I gave it to Lost and Found center at XXX Station. Please check with Mr. YYY, I gave it to him." This saves the owner from searching at multiple locations within the proximity using global positioning system (GPS) data.

Figure 8:
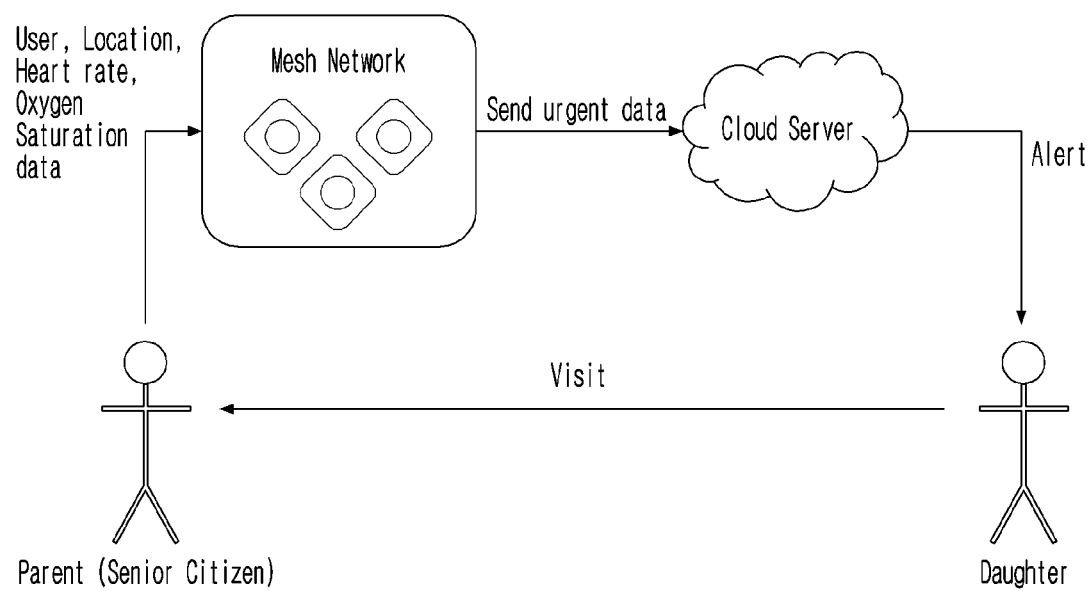
FIG. 8 is a sample use case scenario for an oximeter and a heart rate monitoring according to an embodiment of the disclosure.

FIG. 8 is a sample use case scenario for an oximeter and a heart rate monitoring according to an embodiment of the disclosure.

Referring to FIG. 8, it describes the use case scenario for emergency alert using a modular Tag device as an oximeter and a heart rate monitoring. The modular extension of the Tag device may be designed in the form of a bracelet designated for senior citizens. The bracelet may be equipped with an oximeter and a heart rate sensor which may be used to monitor the health of senior citizens. For a certain interval, e.g., for every 1 hour, the sensor may take user's oxygen saturation and heart rate data. When the data meet certain rule, for example when the oxygen saturation value is less than 95% or heart rate above 100, the bracelet may send user's identity, location data, oxygen saturation data, and heart rate data to the cloud server. The cloud server may check user's relatives or close friends, then alert them and show the user's location. When receiving this alert, the receiver may visit the user of the tag device to check if there is an emergency treatment needed.

Figure 9:
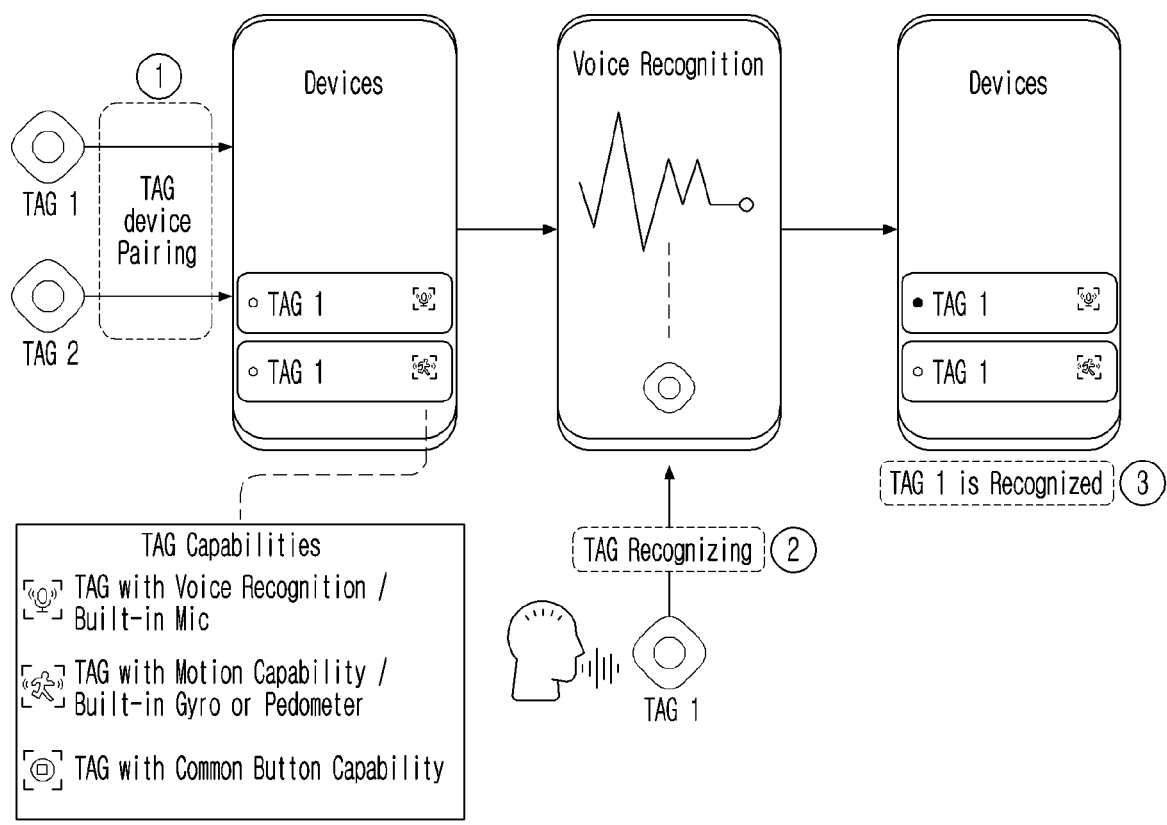
FIG. 9 is a Device Pairing and Recognition diagram according to an embodiment of the disclosure.

FIG. 9 is Device Pairing and Recognition diagram according to an embodiment of the disclosure.

Figure 10:
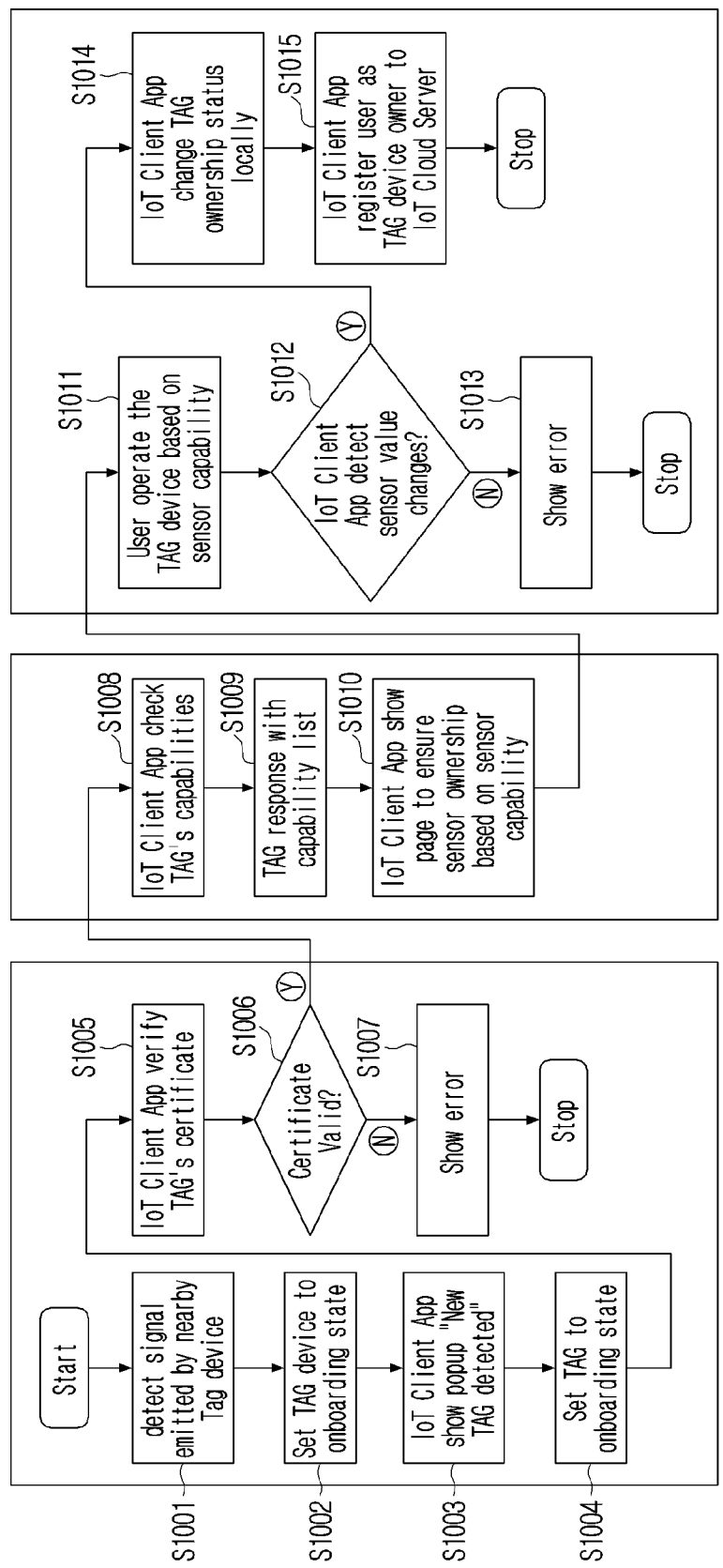
FIG. 10 is a flow diagram for device pairing and recognition according to an embodiment of the disclosure.

FIG. 10 is the flow diagram for device pairing and recognition according to an embodiment of the disclosure.

Referring to FIGS. 9 and 10, they describe the general flow of device pairing and recognition to illustrate the onboarding process. Referring to FIG. 9, the onboarding process includes a device-user pairing and capability recognition mechanism. The device-user pairing process may define who may use the TAG device. The TAG recognition is the mechanism to recognize the TAG device type that is currently onboard, including which sensor the TAG device has and its capabilities. The device pairing and recognition process may be divided into 3 groups of operations. Referring to FIG. 10, it describes the flow of process for the device pairing and recognition operations groups. The first group is the verification of the paired device's validity by the IoT client app. When the IoT client app detected a signal emitted by a nearby Tag device at operation S1001, it will show a popup that notifies the user about a new detected device at operation S1003. The IoT client app may then verify a Tag's certificate at operation S1005, after certain user presses the "Add" button at operation S1004. The process may continue when the IoT client app identifies that the certificate is valid at operation S1006. Otherwise, the process may be stopped and shows an error message to the user at operation S1007. The purpose of this operation is to ensure that the app may work only for the designated devices. The second group is when the IoT client app is reading capability of device to recognize the type of the device. The purpose of this operation is to understand the Tag device type based on the small data stored inside the Tag device, hereinafter referred to as capabilities. The IoT client app may check the capabilities of the Tag device based on at operation S1008. This information may later be used by IoT client app to decide what to do to the data received from the Tag device. The Tag device may response with capability list at operation S1009. The Tag device type may define how the IoT client app can verify device ownership. The last group is for physical ownership verification. The purpose of physical ownership verification is to ensure that the user has real physical control to the device. When the user does something to the Tag's sensor at operation S1011, for example speaking to voice type Tag, or using the oximeter Tag, the Tag device may emit the data to IoT client app. Upon receiving this data at operation S1012-Y, the IoT client app may change the ownership status of the Tag device locally at operation S1014. The IoT client app may then record that the user is the owner of the paired Tag device to IoT cloud server at operation S1015. The user and tag identification data are then registered to IoT cloud server. Upon receiving this data at operation S1012-N, the IoT client app may show an error in operation S1013.

Figure 11:
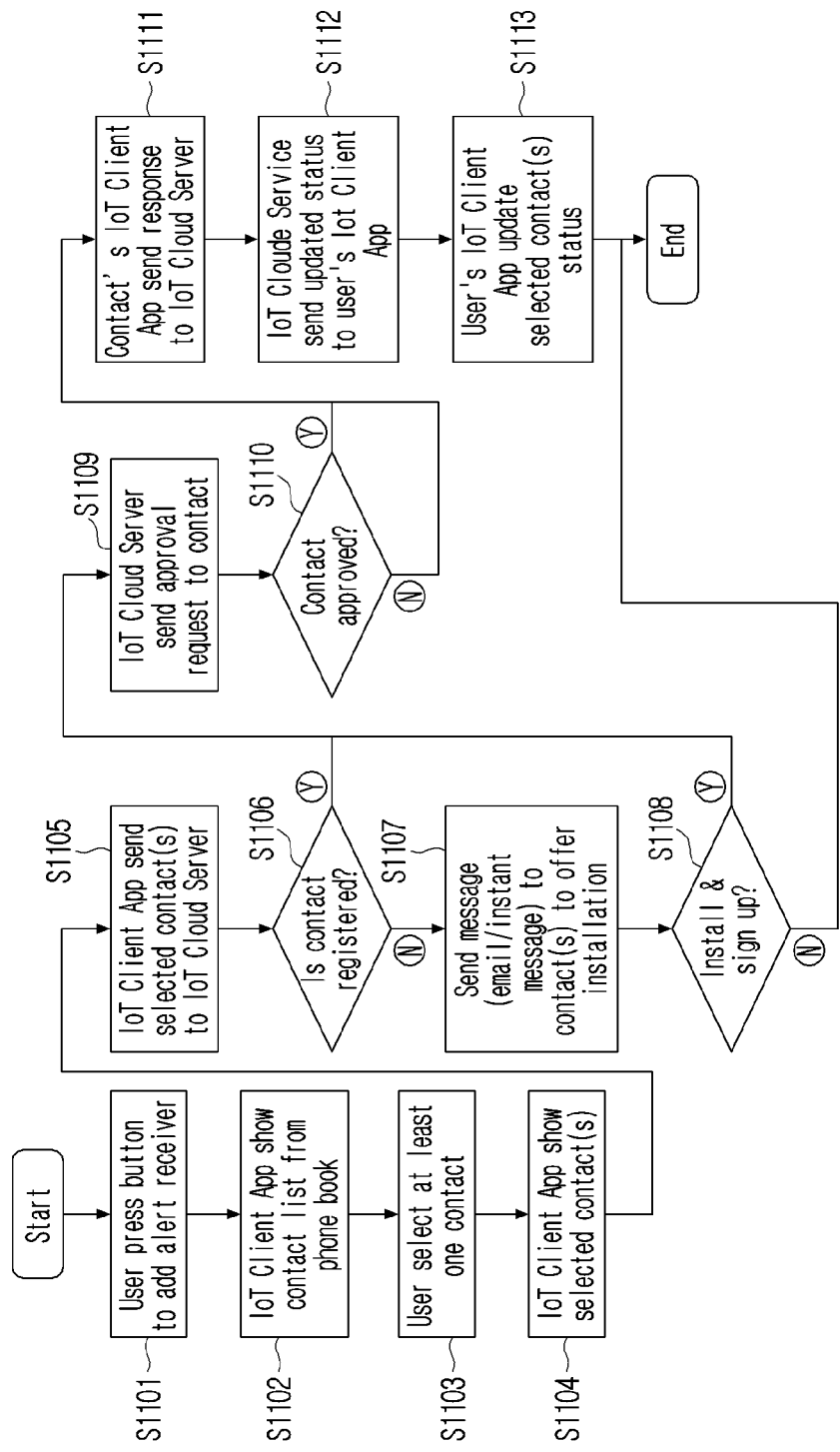
FIG. 11 is a flow diagram for a rule and close friends settings according to an embodiment of the disclosure.

FIG. 11 is the flow diagram for rule and close friends settings according to an embodiment of the disclosure.

Referring to FIG. 11, describes the flow of process for adding a contact as alert receiver. When certain condition triggers a Tag device to send an alert, the Tag device may send data, which may be forwarded to the IoT Cloud Server. Then, the IoT Cloud Server may send the data to a list of previously selected recipients, called Close Friends. The user may choose and add contacts as close friends from the IoT Client App. First, the user or the tag device owner may press the button to add the contacts that may be the recipient of the alert at operation S1101. The IoT Client App may show Tag owner's contacts list from a source, i.e., the phone address book at operation 51102. The user or the Tag device owner may select one or more contacts from the list at operation S1103. Then, the IoT Client App may show and send the selected contacts to the IoT Cloud Server at operations S1104 and S1105. If a selected contact is not registered at operation S1106-N, the IoT Cloud Server may send a message to the selected contact to prompt IoT Client App installation at operation S1107. When the contacts are already registered at operation S1106-Y, the IoT Cloud Server may send a push message to the IoT Client App containing an approval request at operation S1109. The IoT Client App on the selected contacts side may show an approval request to receive an alert from a Tag device owned by a certain Tag device owner. When a selected contact has approved the request at operation S1110-Y or install and sing up in operation S1108-Y, the IoT Cloud server may group the contact into the Tag device owner's Close Friends group in operation S1111, S1112 and S1113.

Figure 12:
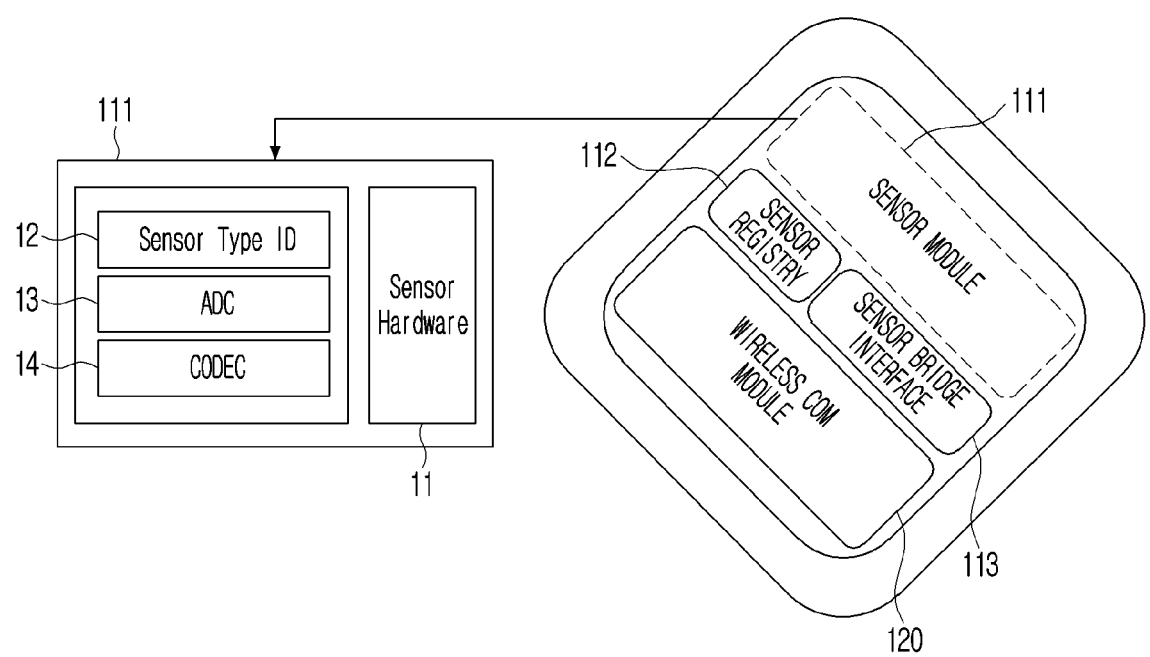
FIG. 12 is an overview of a tag modular sensor stack according to an embodiment of the disclosure.

FIG. 12 is an overview of a tag modular sensor stack according to an embodiment of the disclosure.

Referring to FIG. 12, it describes the overview of a Modular Sensor Stack. A Tag device is designed to have a modular sensor stack (110) with a stack arrangement that consists of several parts, namely a sensor module (111), a sensor Registry (112), and a sensor Bridge Interface (113). The sensors embedded in the tag device are modular, which means that a tag device can support different types of sensor modules such as G sensors, microphone, or accelerometers, depending on the needs of the user. As may be seen on FIG. 12, the sensor module (111) consists of several constituent parts, namely sensor hardware (11), a sensor Type ID (12), an Analog to Digital Converter (ADC) (13) and Codecs (14). The ADC (13) may be used to complement analog data of the sensor hardware(s) (11) like a Gyro, a Pedometer, and an Accelerometer, to provide the digital data output for other modules. For the case of the Codec (14), it may be used only when the Sensor Hardware (11) is an Audio sensor type, such as a microphone. The Codec (14) may be implemented using LC3 or other methods that support audio data. A Sensor Bridge Interface (113) is a part of modular sensor stack (110) that is used as a data communication lane from the sensor module (111) until it may be transmitted by the wireless communication protocol module (120). Sensor Bridge Interface (113) may identify the sensor type of the installed module by identifying the Sensor Type ID (12) that is in the sensor module (111). A Sensor Registry (112) stores all information required in memory for doing communication with a specific Sensor Module attached on the Sensor Bridge Interface (113), e.g., Sensor Type ID mapping to the attached address or port.

Figure 13:
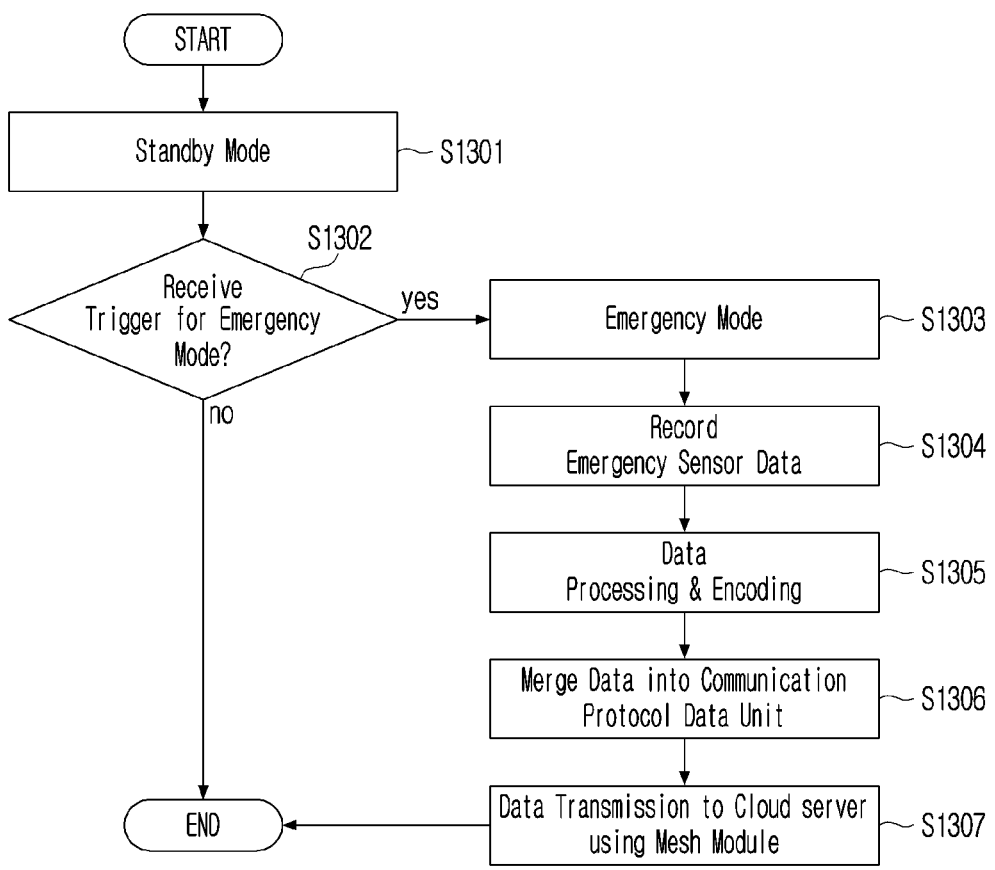
FIG. 13 is a general flow for a tag sensor trigger according to an embodiment of the disclosure.

FIG. 13 is the general flow for tag sensor trigger according to an embodiment of the disclosure.

Referring to FIG. 13, it describes the general flow for Tag sensor trigger. The process starts from the tag device in standby mode at operation S1301. The attached sensor is still active but not performing data acquisition while in standby mode. In case the device's power source is not constrained, i.e., not using a battery, the data acquisition may still be performed with a lower data sampling rate. When an Emergency trigger from a button attached to the Tag device or a sensor output is received at operation S1302, it indicates a trigger to activate the Emergency mode which means the sensor is activated to perform its function, data acquisition at operations S1303 & S1304. Then, sensor data are processed & encoded depending on the sensor type at operation S1305. The recorded data is then merged into one or more PDU using the standard protocol of the Wireless Communication Module at operation S1306. The data is transmitted to the cloud server using the mesh module in operation S1307.

Figure 14:
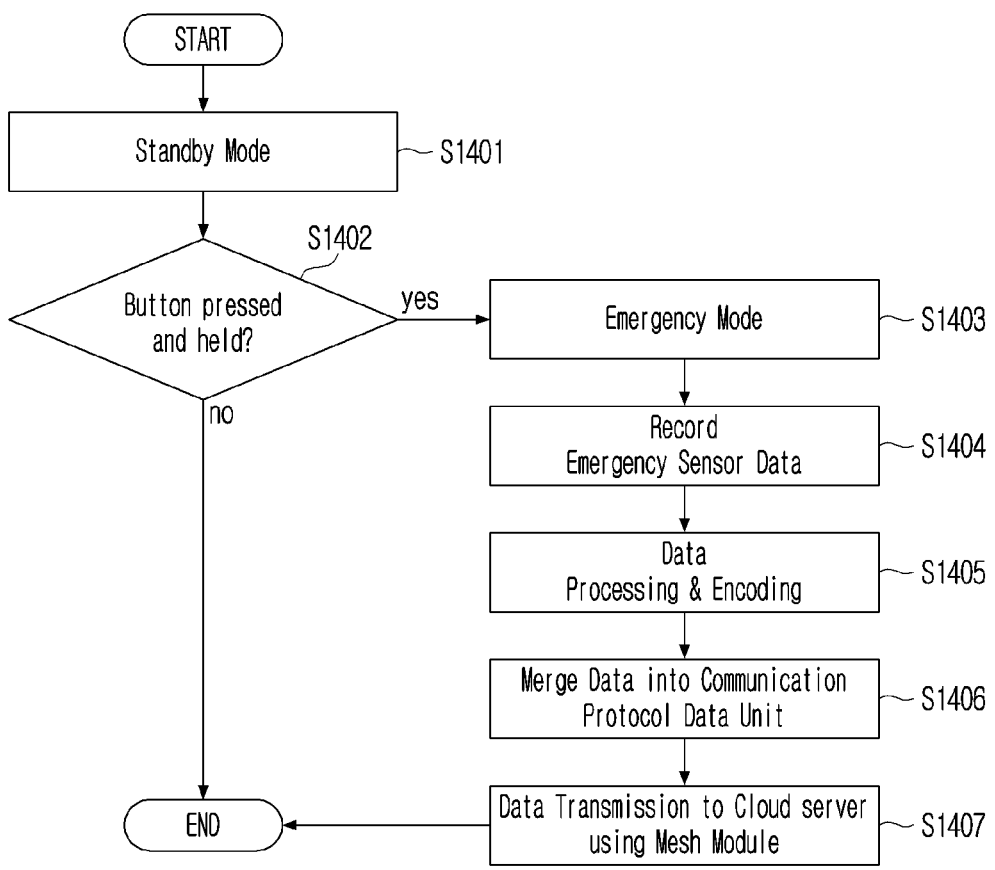
FIG. 14 is a flow diagram for a tag sensor trigger when a button is activated according to an embodiment of the disclosure.

FIG. 14 is the flow diagram for tag sensor trigger when button activated according to an embodiment of the disclosure.

Referring to FIG. 14, it describes the flow of process of Tag sensor trigger when emergency button is activated. The process starts with the tag sensor in standby mode at operation S1401, which means the attached sensor is still active but not performing data acquisition. When the button is pressed and held at operation S1402, it indicates a trigger to activate the Emergency mode which means the sensor is activated and may perform data acquisition at operations S1403 & S1404. Then, sensor data are processed & encoded depending on the sensor type at operation S1405. The recorded data then merged into one or more PDU using the standard protocol of the Wireless Communication Module at operation S1406. The data is transmitted to the cloud server using the mesh module in operation S1407.

Figure 15:
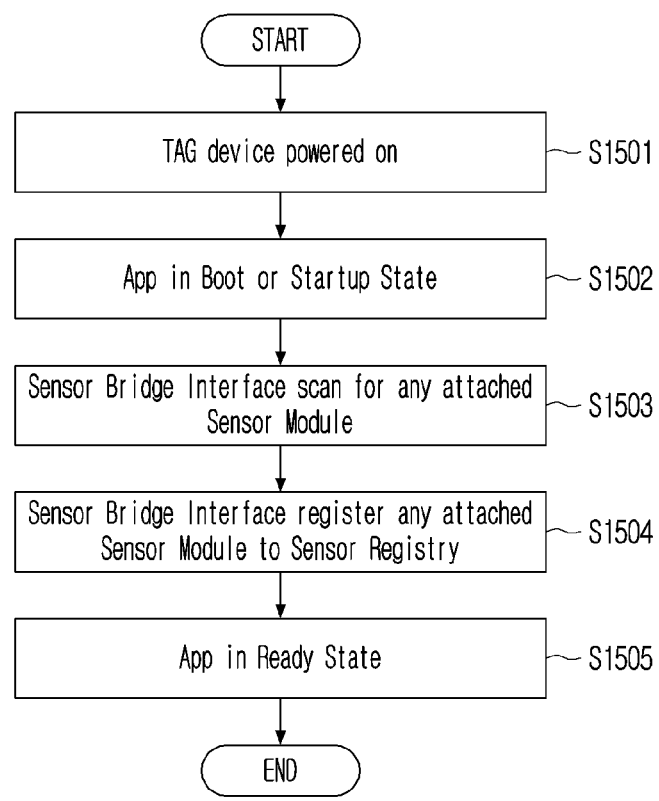
FIG. 15 is a flow diagram for a sensor module registration flow according to an embodiment of the disclosure.

FIG. 15 is a flow diagram for a sensor module registration flow according to an embodiment of the disclosure.

Referring to FIG. 15, it describes the flow of process for a sensor module registration. The information related to the attached sensor on a Sensor Bridge Interface is stored in the Sensor Registry while the Tag device is in a startup state. This operation is required so the embedded App (the Application layer) in the Tag device could determine which Sensor Module(s) is attached and which address to use to communicate with this the Sensor Module(s) during its operating state by retrieving the data from the Sensor Registry. The scanning operation in Sensor Bridge Interface is performed by its driver program. See operations S1501-S1505.

Figure 16:
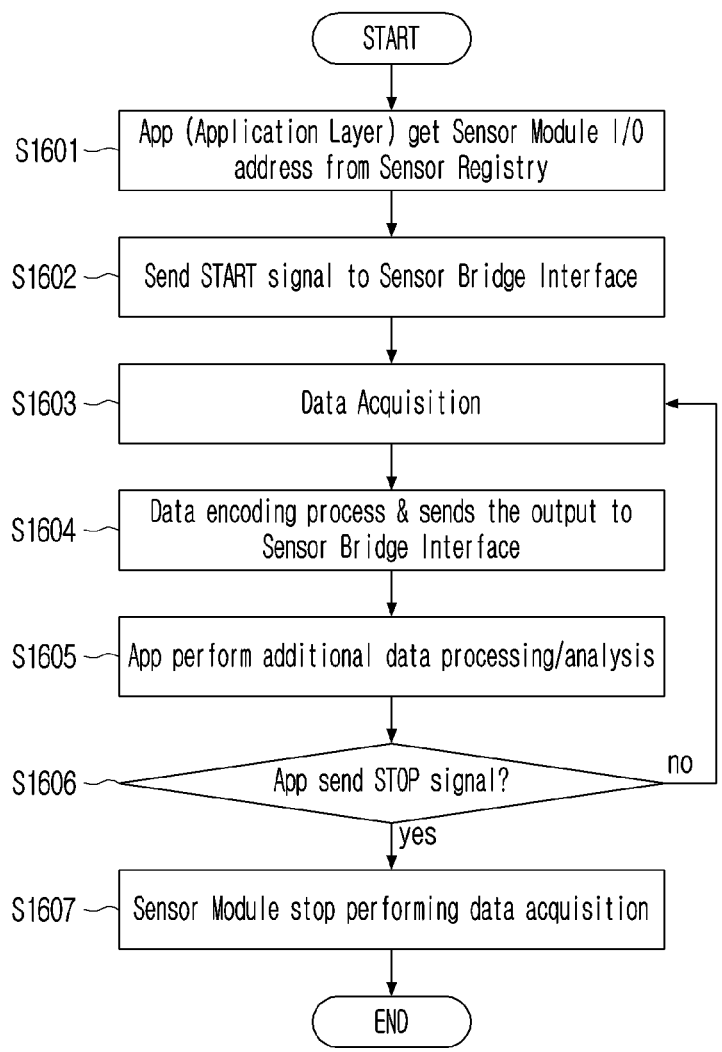
FIG. 16 is a flow diagram for data acquisition between a sensor module and an app of an application layer according to an embodiment of the disclosure.

FIG. 16 is a flow diagram for data acquisition between a sensor module and an app on application layer according to an embodiment of the disclosure.

Referring to FIG. 16, it describes the data acquisition flow between sensor module and app on application layer. The sensor module registration process needs to be done first, before any data acquisition process may be performed. The data acquisition process starts with the embedded App on the Application layer getting the Sensor Module address from the Sensor Registry at operation S1601. After the address is confirmed, the embedded App sends a START signal to Sensor Bridge Interface as a trigger for starting the data acquisition process in a specific Sensor Module at operations S1602 & S1603. Sensor Module may then perform data encoding at operation S1604. The digital output of the encoding process is sent to Sensor Bridge Interface to be forwarded to the embedded App to perform additional data processing or analysis at operations S1604 & S1605. The embedded App sends a STOP signal to the Sensor Module to stop performing data acquisition when the data is sufficient at operations S1606 & S1607.

Figure 17A:
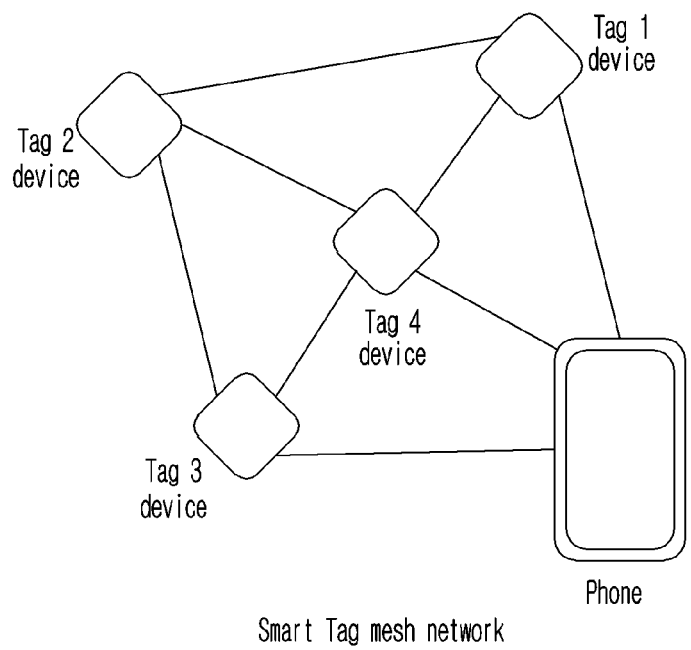
FIG. 17A is an example of a smart Tag mesh network according to an embodiment of the disclosure.

FIG. 17A is an example of a smart Tag mesh network according to an embodiment of the disclosure.

Figure 17B:
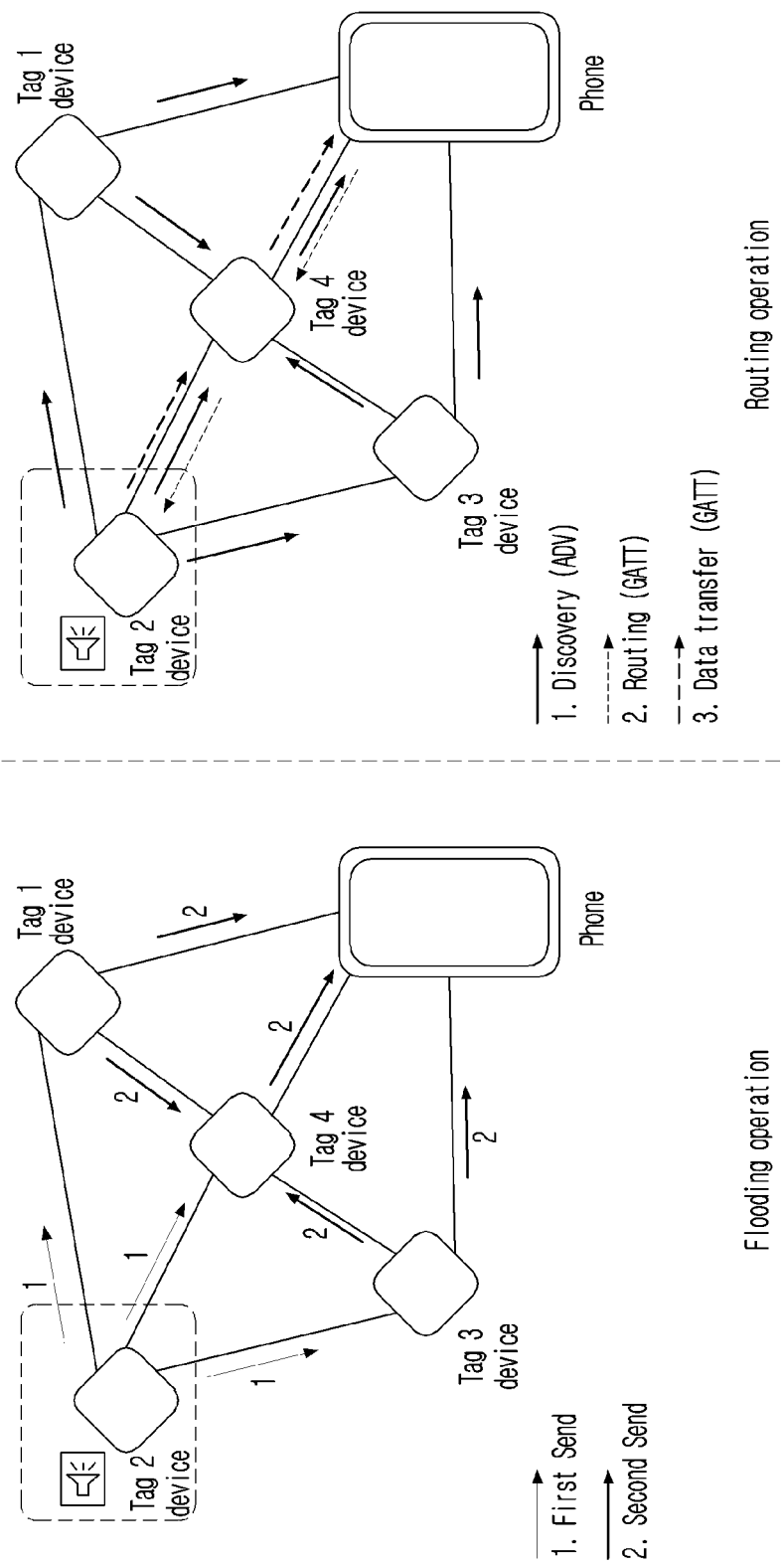
FIG. 17B is an example of a flooding operation according to an embodiment of the disclosure.

FIG. 17B is an example of flooding operation according to an embodiment of the disclosure.

Referring to FIGS. 17A and 17B, they describe an example of a routing operation in a wireless mesh network. The Wireless Mesh Network is an existing technical concept for BLE devices. The mesh network consists of devices or nodes that are connected to other nodes and may exchange data. It is usually used to aid connectivity in some condition where two nodes that need to exchange data aren't directly connected, by broadcasting the packet and use other nodes to help relaying the data. The disclosure is utilizing the mentioned concept to solve the connectivity issues in a Tag emergency alert system. One of the issues that exists, is when the Tag with emergency goes offline, but there is no reachable smartphone when it advertises the alert. In this case, if there are other devices that are not connected to the cloud server but are reachable from the emergency Tag, they may act as a mesh network node that may help propagate the alert that may eventually reach the cloud server.

Another important concept in the Mesh Network that may be used is the Flooding and Routing mechanism. Referring to FIGS. 17A and 17B, they illustrate the example of a flooding and routing mechanism. For the case of flooding, BLE advertisement may act as a sender and a BLE Scan may act as receiver in a BLE architecture. For routing, the BLE Advertisement may discover route, establish link and data transfer using Generic Attribute Profile (GATT), for example Dynamic Routing, Multi-Media Telecommunications System (MTS), etc. The routing is more suitable for large amount of data transfer, while Flooding is more suitable for command broadcast. Thus, the disclosure may use the combination of both Flooding and Dynamic Routing to handle emergency alert in the Mesh Network. While the concept of flooding and routing originates from the BLE architecture, the disclosure is not limited to the BLE, but may also apply to other communication methods as well.

Figure 18:
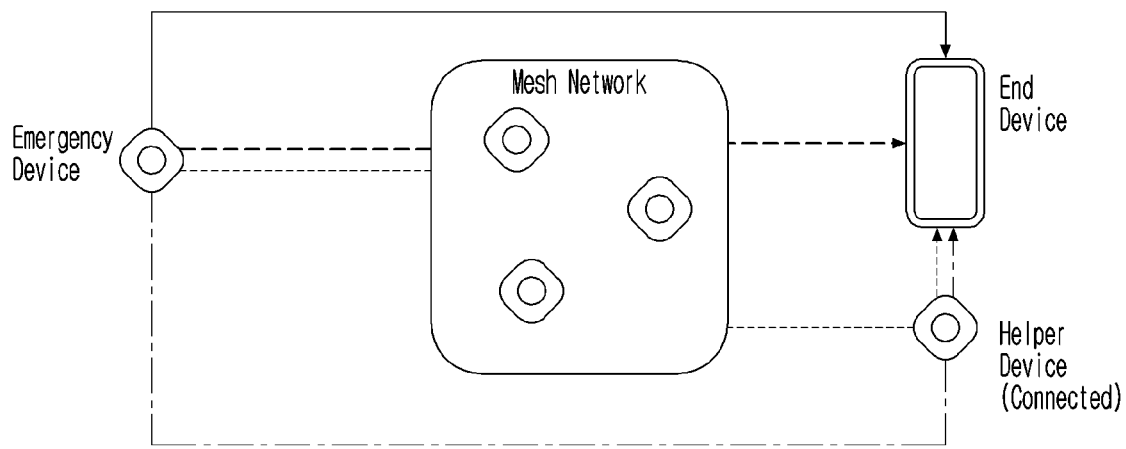
FIG. 18 is an overview of a tag emergency protocol according to an embodiment of the disclosure.

FIG. 18 is an overview of a tag emergency protocol according to an embodiment of the disclosure.

Referring to FIG. 18, it describes the overview of a Tag Emergency Protocol. The Tag Emergency Protocol is a new protocol that is proposed in the disclosure as an extension to a current existing communication method used in the Tag devices. It utilizes the mesh network concept to help propagate alert in less than ideal network conditions. This is a protocol that dictates device behavior and network packets for emergency situation involving the Tag devices and applicable on top of network communication stack, and does not act as a full communication standard. The protocol also should support all wireless communication mediums, such as BLE, Wi-Fi, UWB, etc.

To ensure maximum usage and extensibility, this protocol may support various devices with proper radio capability, not only the Tag devices. This protocol involves four aspects, which are an emergency device, a helper device, an end device, and the cloud server. The emergency device may act as the device that is having the emergency situation. The disclosure focuses on Tags as the primary source for emergency devices, but it does not rule out the possibility that other devices with similar capability of triggering alerts to act as emergency device as well. Helper device is described as a device with compatible radio capability as the Emergency Tag and have the emergency protocol implemented so it may help relaying emergency messages. The tags do not only act as Helper devices, it may also act as a beacon, etc. The Helper device may help to discover an emergency device in proximity to the Helper device. Should the Helper device detect an Emergency Device, it may send an alert message to cloud server, or, propagate the alert message with flooding, acting as the Emergency Device. The end device could be a smartphone or other endpoint that has the capability to access the cloud server and may be used to relay messages from the Emergency/Helper device. Last, the cloud server is needed to receive and store emergency alert messages. It may immediately notify the owner and other relevant people regarding the emergency.

In this protocol, the alert messages from the Emergency Devices need to be transmitted to the End Devices so that it may relay the alert to the cloud server. The usage of this protocol starts when a Tag device detects an emergency, and turns into an Emergency Device. The Emergency Devices may flood the network with request, and may send the data after the request has been responded to, by either the Helper Devices or the End Devices. The Helper Devices may respond to requests from the Emergency Devices, but if they are not in connected themselves, may also turn into the Emergency Devices and flood the network again. This mechanism may create a Mesh Network of Emergency Devices, and the fastest devices to respond may be the ones to relay the emergency alert data.

Referring to FIGS. 19 to 25, 26A and 26B, and 27A and 27B, they describe the different scenarios of using the Tag Emergency Protocol and the flow of processes involved. There are five different scenarios of how the message is relayed. The first scenario is when the emergency device is directly connected to the end device. The second scenario is when the emergency device may find the end device immediately. The third scenario is when the helper device is directly connected. The fourth scenario is via the mesh network, and the mesh network may find the helper device that is directly connected. The fifth scenario is via the mesh network, and the mesh network may find the end device.

Figure 19:
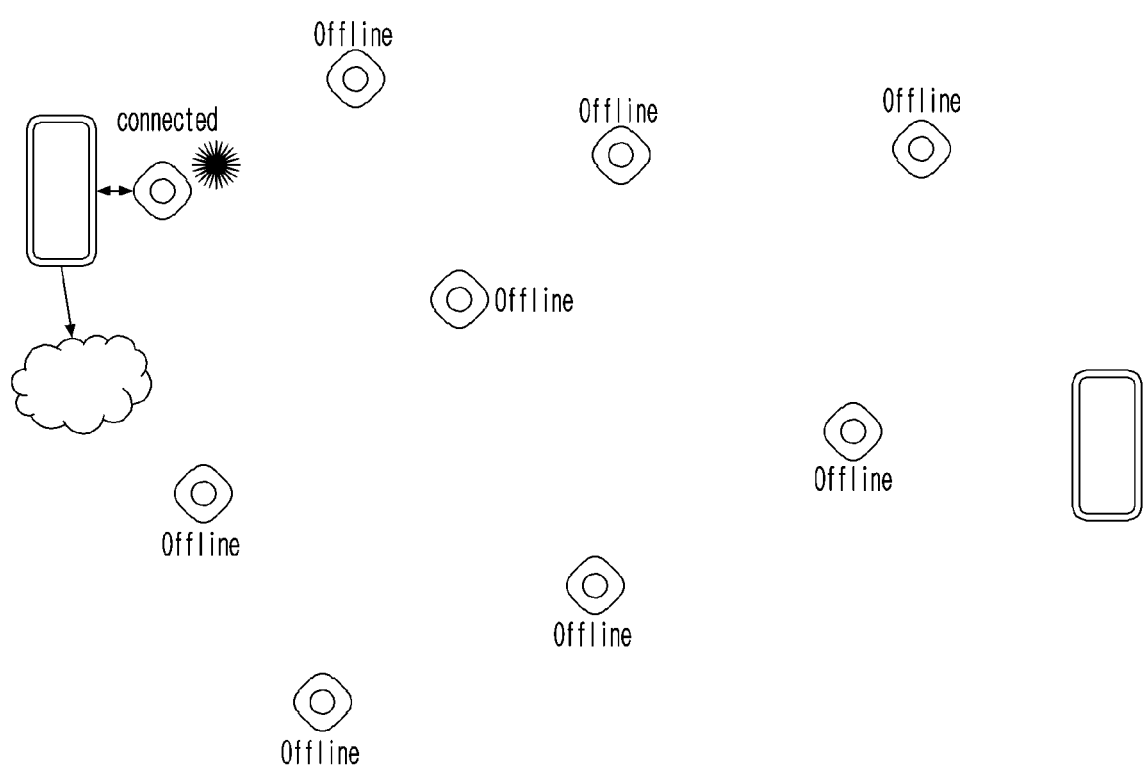
FIG. 19 is an illustration of a connected emergency device according to an embodiment of the disclosure.

FIG. 19 is an illustration of connected emergency device according to an embodiment of the disclosure.

Referring to FIG. 19, it describes the process of a tag emergency protocol with a connected emergency device. The helper devices may try to discover and find a nearby emergency device. It may remain in standby mode so it may be ready to receive an emergency message. When an emergency alert arises from one of the connected devices, the emergency may not be flooded, but may alert to the cloud using an end device connection.

Figure 20:
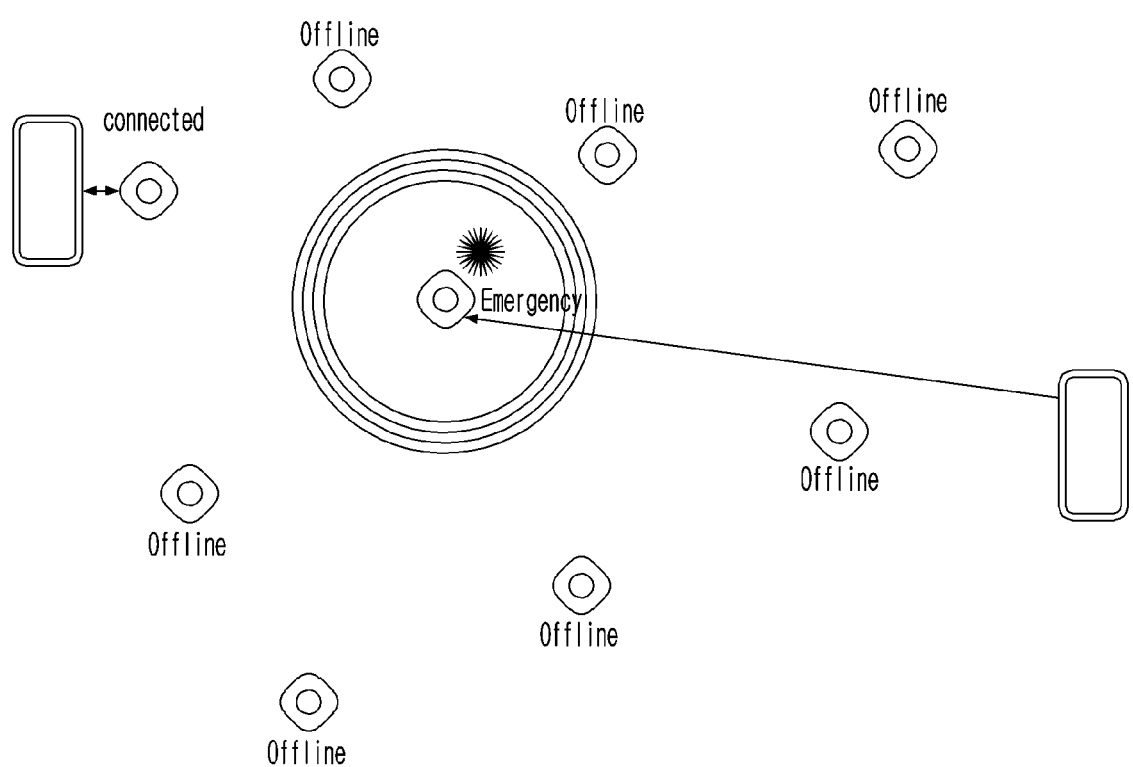
FIG. 20 is an illustration of an offline emergency device direct to end device according to an embodiment of the disclosure.

FIG. 20 is an illustration of an offline emergency device direct to an end device according to an embodiment of the disclosure.

Referring to FIG. 20, it describes the process of tag emergency protocol with offline emergency device direct to end device. The helper devices may try to discover and find nearby emergency device. It may remain in standby mode so it may be ready to receive the emergency message. Should an emergency arise from an offline device, it may flood an emergency to the mesh network. When an end device picked up the emergency, the end device may establish connection to the emergency device. Then, the end device may request alert from the emergency device, and it should respond accordingly, with the alert message, if available, such as a voice message. The end device may then send an alert to the cloud server, and send a completion to indicate a successful alert to the cloud server. The emergency device may receive Completion and Stop Emergency, and may turn back into offline mode.

Figure 21:
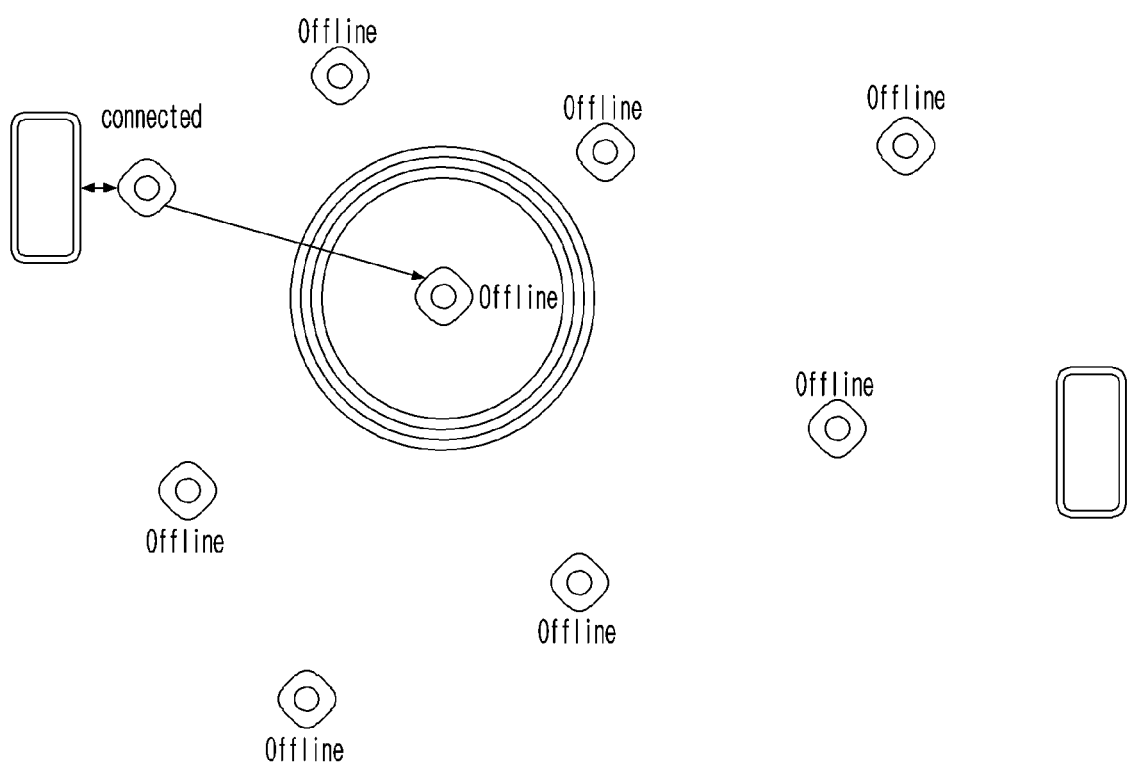
FIG. 21 is an illustration of an offline emergency device via connected helper device according to an embodiment of the disclosure.

FIG. 21 is an illustration of an offline emergency device via a connected helper device according to an embodiment of the disclosure.

Referring to FIG. 21, it describes the process of a tag emergency protocol with an offline emergency device via a connected helper device. The helper devices may try to discover and find a nearby emergency device. It may remain in standby mode so it may be ready to receive an emergency message. Should the emergency arise from offline device, it may flood the emergency to the mesh network. When a connected helper device received the emergency alert, it may establish a connection with the emergency device. The helper device may request an alert from the emergency device, and the emergency device may respond accordingly, with an alert message, if available, such as a voice message. The helper device may send the emergency to the cloud using a connected end device connection. Upon successful alert to the cloud server, the helper device may send a completion to the emergency device. The emergency device may then receive the completion and stop emergency command.

Figure 22:
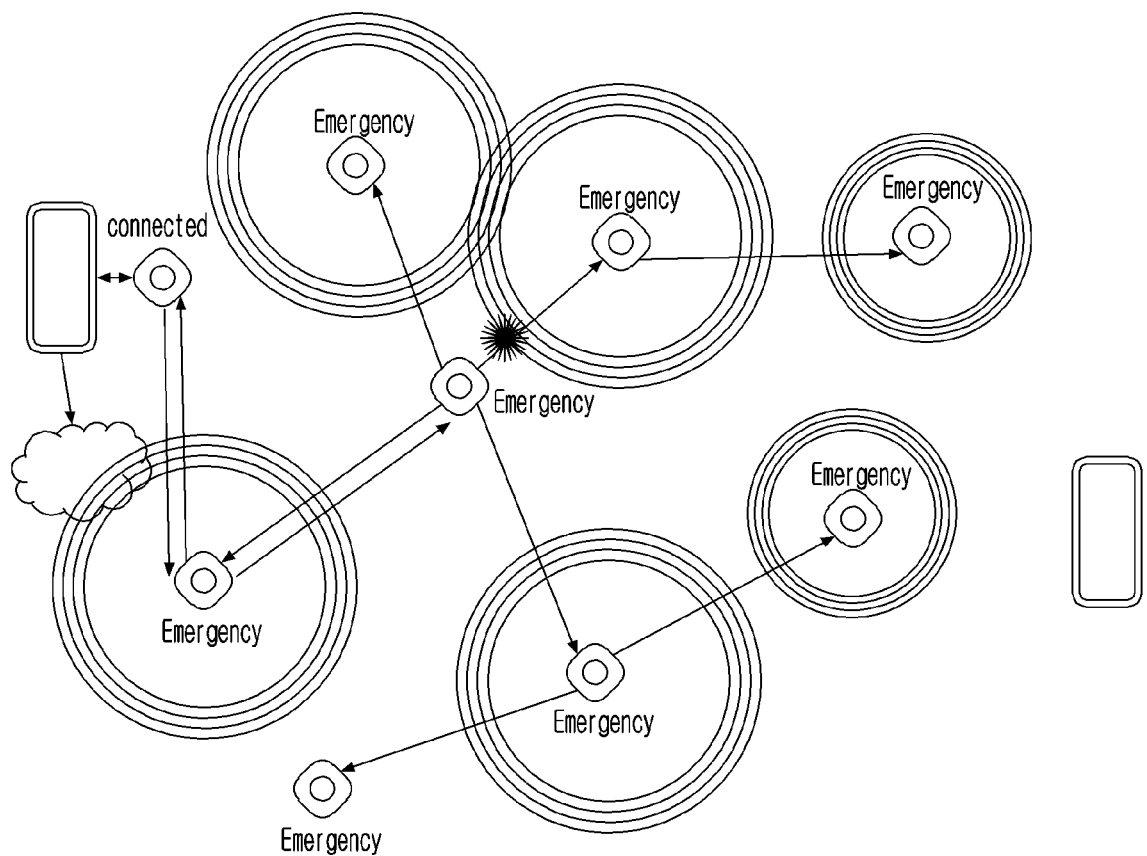
FIG. 22 is an illustration of an offline emergency device via a mesh network according to an embodiment of the disclosure.

FIG. 22 is an illustration of an offline emergency device via a mesh network according to an embodiment of the disclosure.

Referring to FIG. 22, it describes the process of a tag emergency protocol with an offline emergency device via a mesh network and a send connected helper device. The helper devices may try to discover and find nearby emergency device. It may remain in standby mode so it may be ready to receive an emergency message. Should an emergency arise from the offline device, it may flood the emergency to the mesh network. When a connected helper device received the emergency alert, it may establish a connection with the emergency device. The helper device may propagate to flood the mesh network with the emergency. When a connected helper device picks up the emergency from the helper, it may connect and request the alert from the emergency device. The propagator Helper Device may consequently request to its sender, and finally at the source Emergency Device, may response accordingly, with message if available, such as a voice message. Then, the connected device may send the message to the cloud via the End Device.

Figure 23:
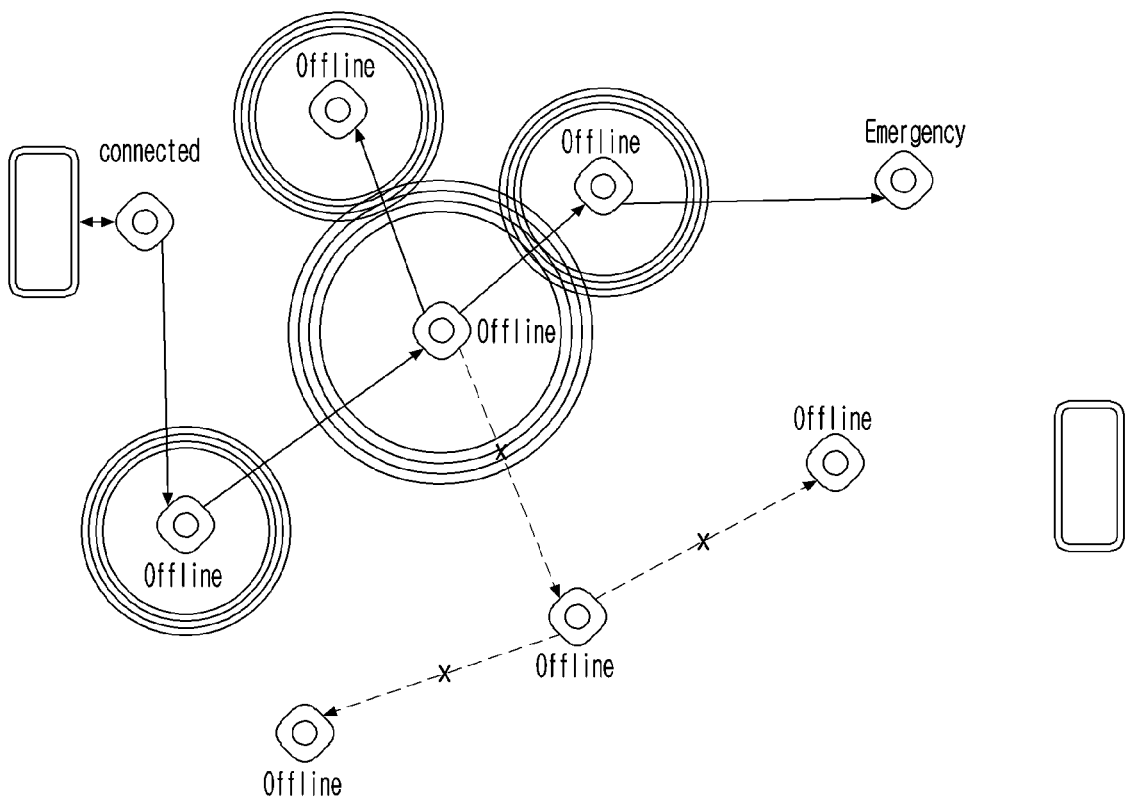
FIG. 23 is an illustration for stopping an offline emergency device via a mesh network according to an embodiment of the disclosure.

FIG. 23 is an illustration for stopping an offline emergency device via a mesh network according to an embodiment of the disclosure.

Referring to FIG. 23, it describes the process of a tag emergency protocol for stopping offline emergency device upon completion via mesh network. Sender Helper Device may flood Stop Emergency, returning to offline state, and propagate Completion to its sender, in this case the Emergency Device. Source Emergency Device also may flood Stop Emergency, and return to Offline. Nearby Helper Device may receive Stop Emergency flood and in turn, propagate Stop Emergency and turn into Offline. In case Helper Device does not receive any packet for allotted time, it disconnects with the sender, and turns itself into offline without flooding Stop Emergency.

Figure 24:
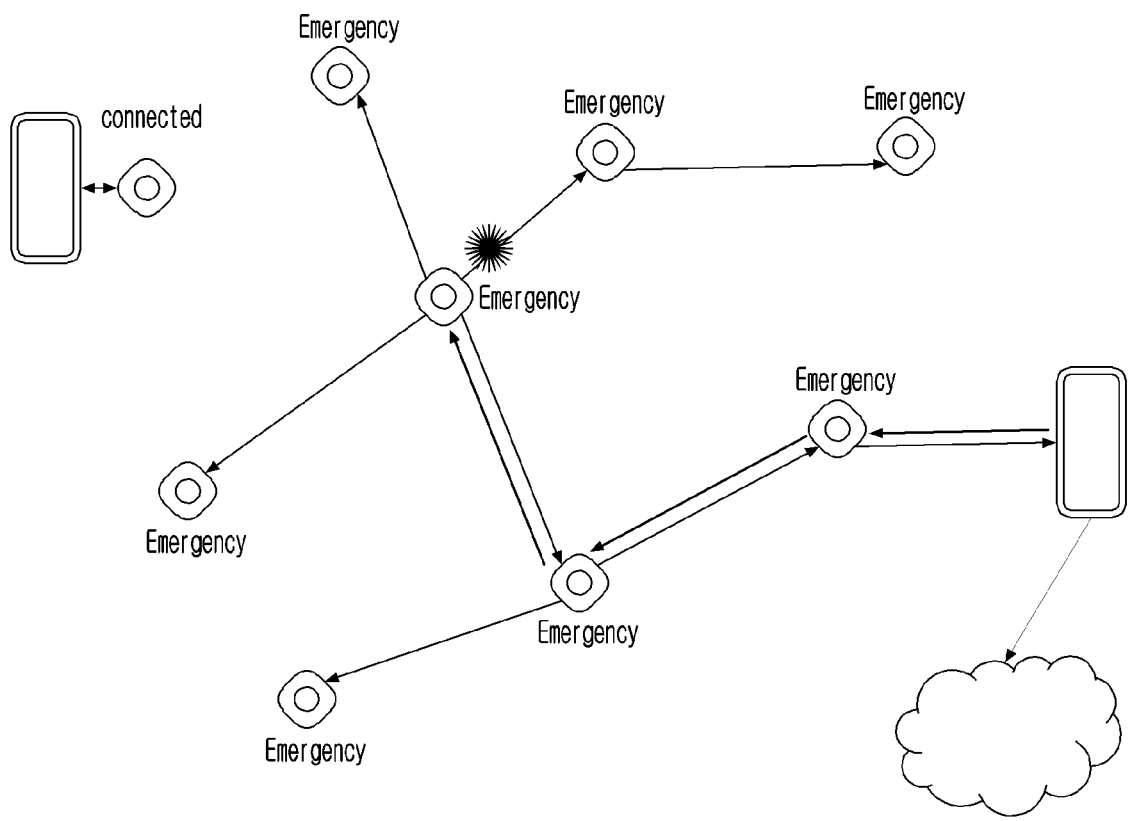
FIG. 24 is an illustration of an offline emergency device via a mesh network and a connected end device according to an embodiment of the disclosure.

FIG. 24 is the illustration of offline emergency device via mesh network and connected end device according to an embodiment of the disclosure.

Referring to FIG. 24, it describes the process of a tag emergency protocol with an offline Emergency Device via a mesh network and a connected End Device. The Helper Devices may try to discover, finding nearby Emergency Devices, ready to receive the emergency. Should the emergency arise from an offline device, it may flood the emergency to the mesh network. Should the emergency be picked up by the offline Helper Device, the Helper Device should establish connection to the Emergency Device. The Helper Device may then propagate to flood the mesh network with the Emergency. Should an End Device pick up the emergency, it may establish connection and request alert to the emergency sender. The propagator Helper Device may propagate request until reaching the source Emergency Device, which may respond to the alert accordingly, with a message, if available, such as a voice message. Then, the End Device may send the alert to the cloud.

Figure 25:
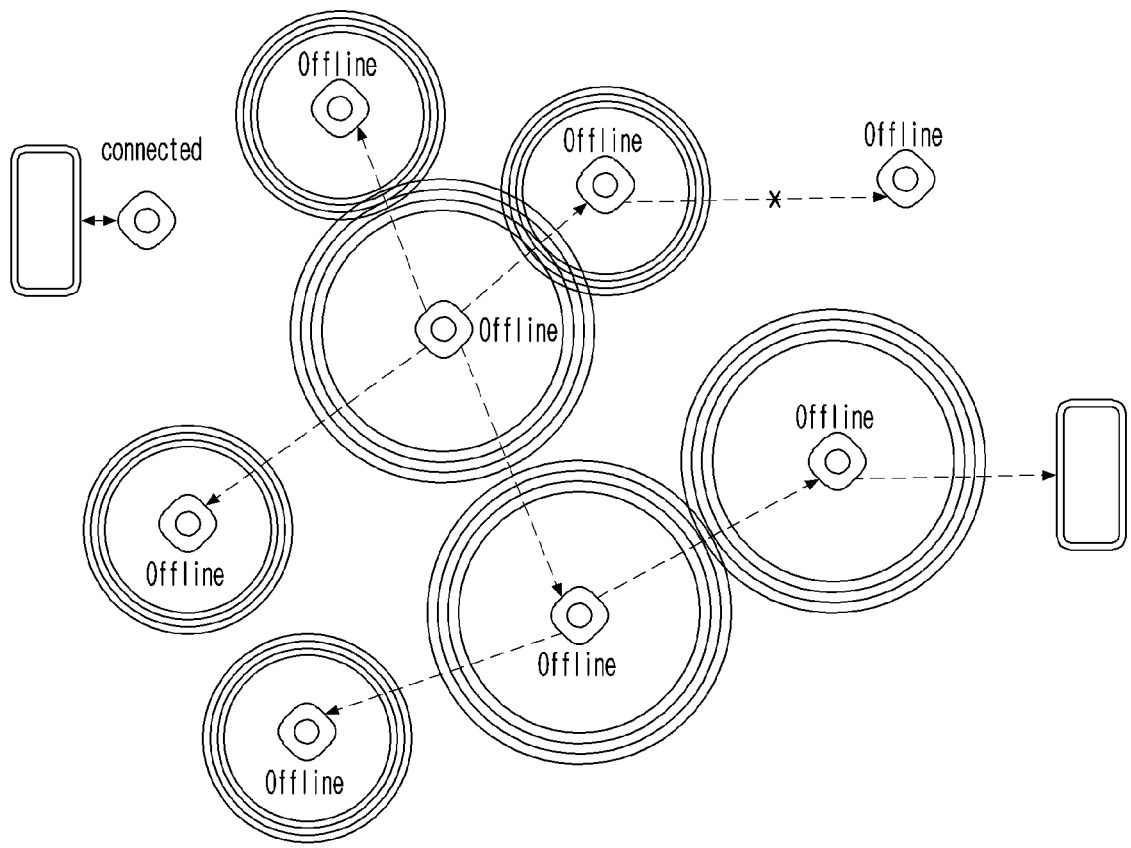
FIG. 25 is an illustration for stopping an offline emergency device via a mesh network and a connected end device according to an embodiment of the disclosure.

FIG. 25 is an illustration for stopping an offline emergency device via a mesh network and a connected end device according to an embodiment of the disclosure.

Referring to FIG. 25, it describes the process of stopping an Emergency upon completion. End device may send Completion to sender device. First, the Helper Emergency Device receives Completion, and floods Stop Emergency, and propagate Completion to its sender, and finally turn itself into Offline. If the Helper Device receives the Stop Emergency flood with same ID, without receiving a Completion, it may also flood Stop Emergency and disconnect established connection, and turn itself into an Offline state. If the Helper Device does not receive any packet within allotted time, i.e., no flooding Stop Emergency, it may disconnect its sender and turn itself into the Offline state.

Figure 26A:
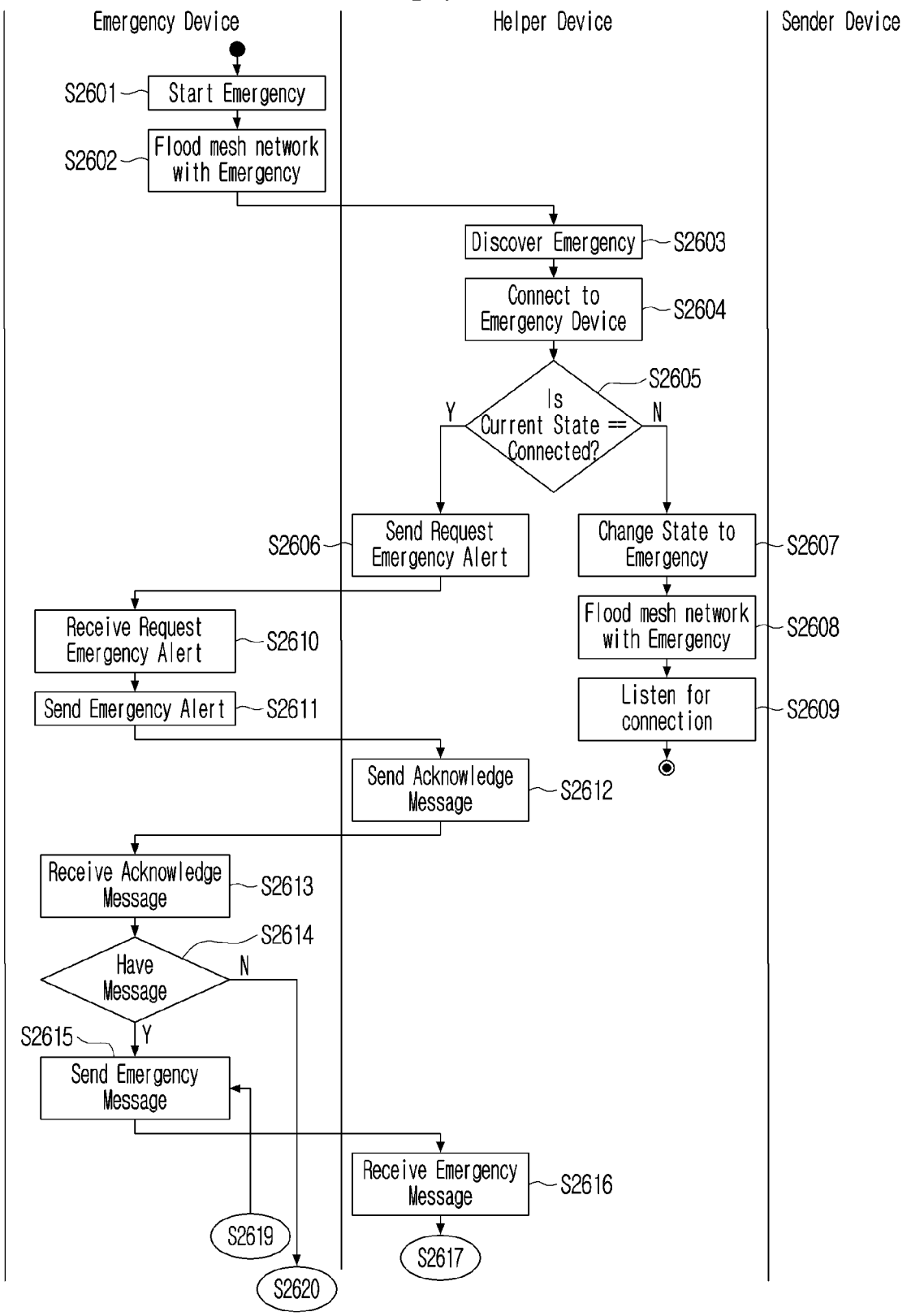
FIG. 26A is a process flow for an offline emergency device via a connected helper device according to an embodiment of the disclosure.

FIG. 26A is a process flow for an offline emergency device via a connected helper device according to an embodiment of the disclosure.

Figure 26B:
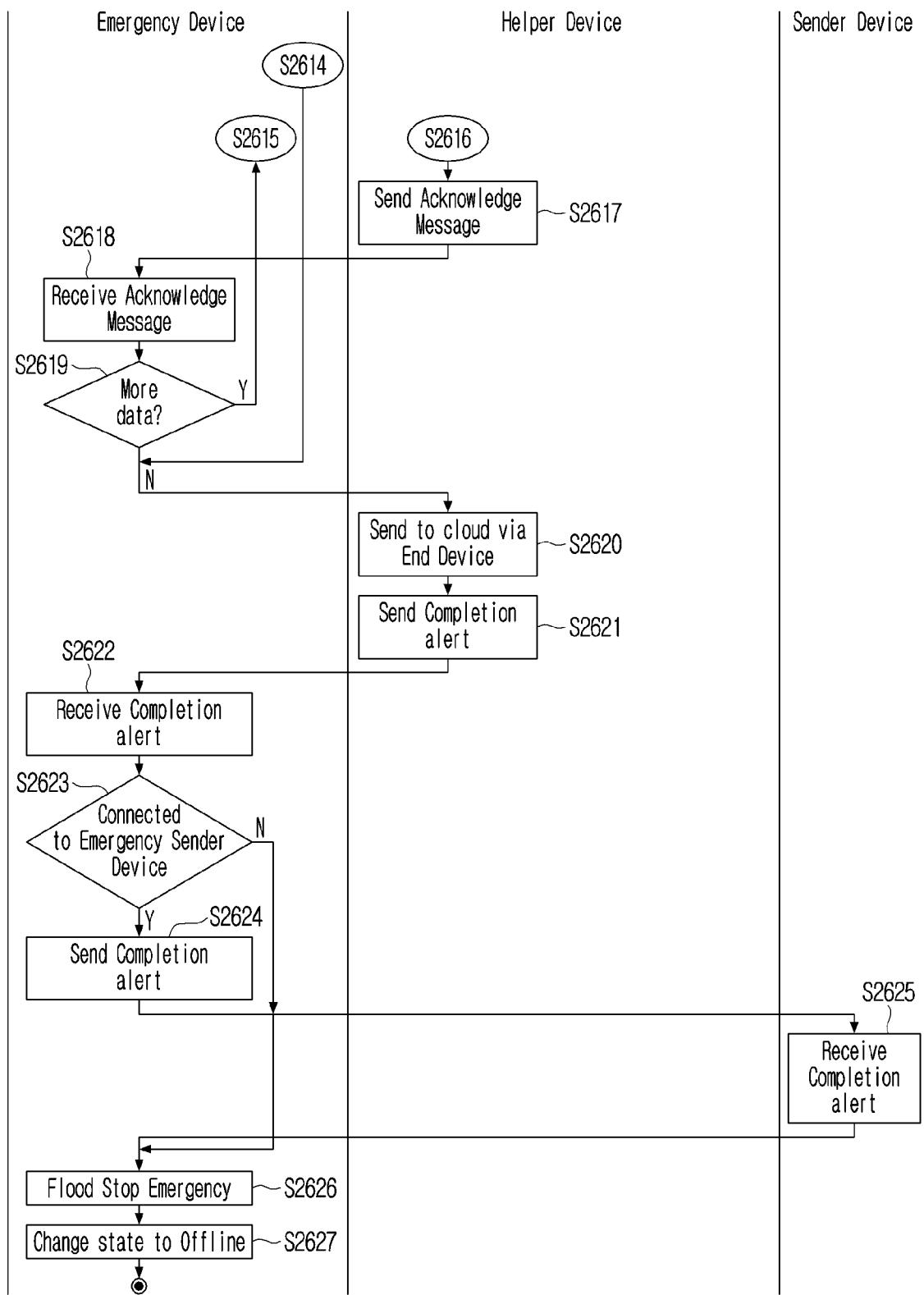
FIG. 26B is a process flow for an offline emergency device via a connected helper device according to an embodiment of the disclosure.

FIG. 26B is a process flow for an offline emergency device via a connected helper device according to an embodiment of the disclosure.

Referring to FIGS. 26A and 26B, they describe a flow of a process for an offline emergency device via a connected helper device. It is the protocol for when the emergency is being propagated via the Helper Device, including both cases when the Mesh Network is needed or unneeded. The process is performed according to operations S2601 to S2627

Figure 27A:
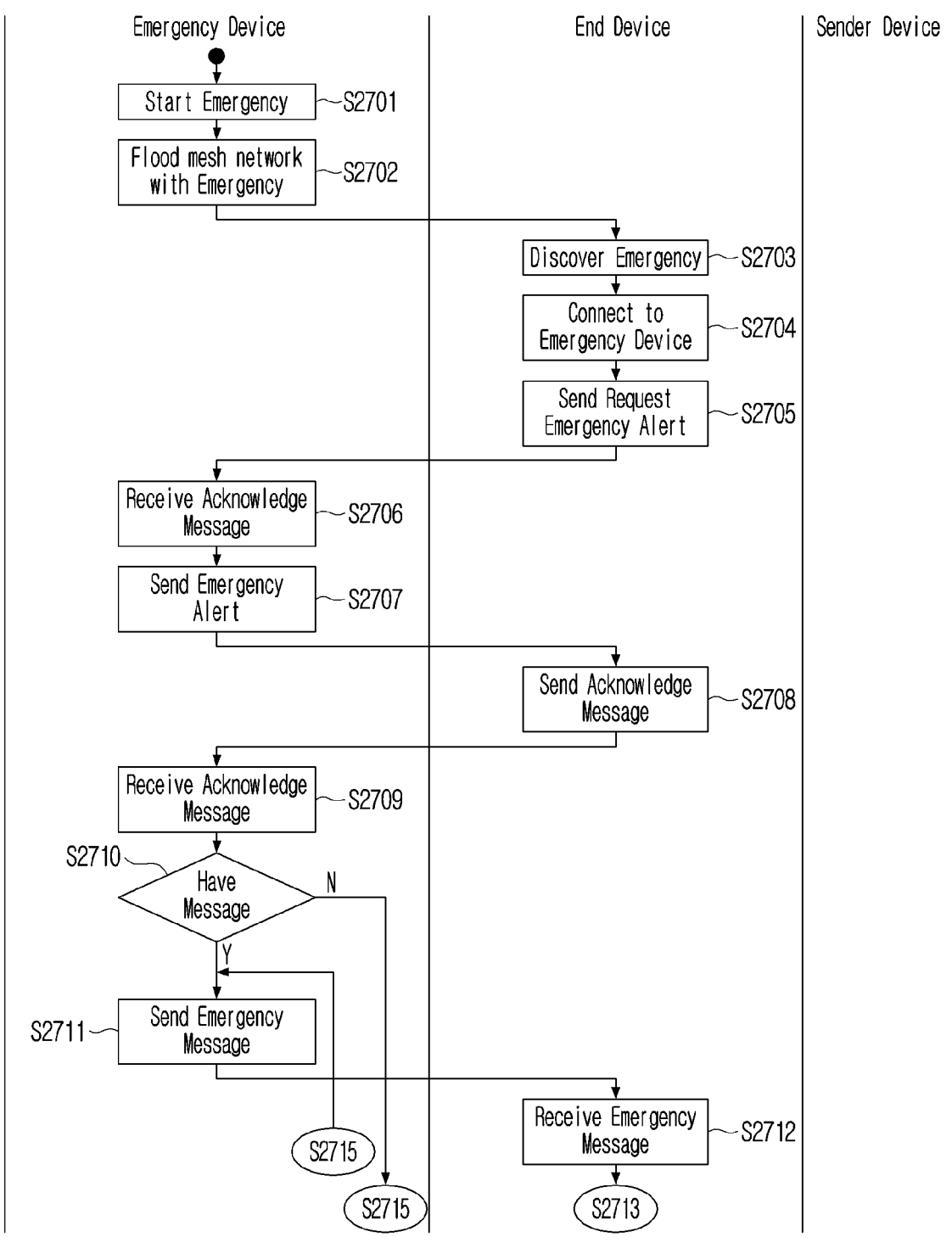
FIG. 27A is a process flow for an offline emergency device via an end device according to an embodiment of the disclosure.

FIG. 27A is a process flow for an offline emergency device via an end device according to an embodiment of the disclosure.

Figure 27B:
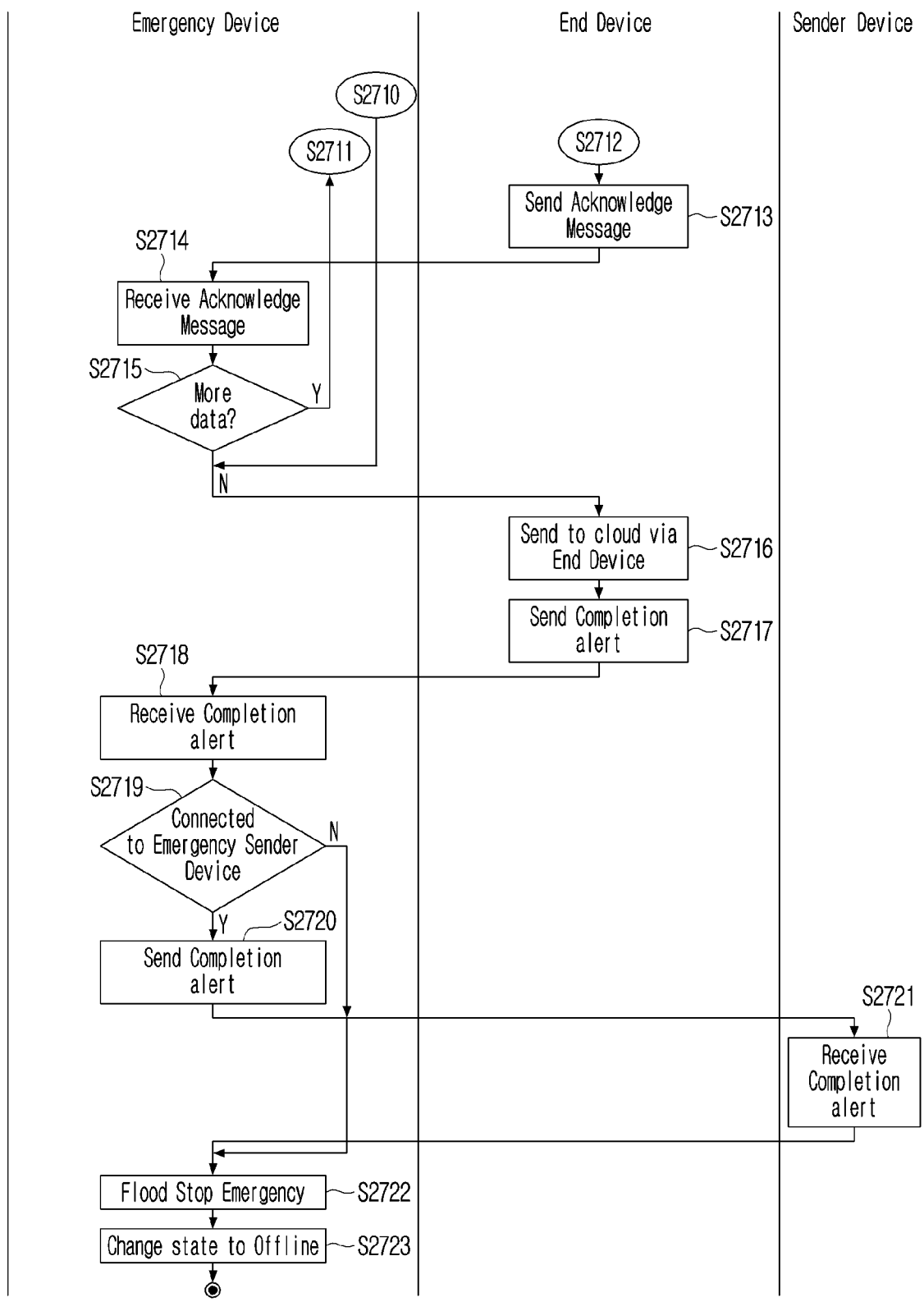
FIG. 27B is a process flow for an offline emergency device via an end device according to an embodiment of the disclosure.

FIG. 27B is a process flow for an offline emergency device via an end device according to an embodiment of the disclosure.

Referring to FIGS. 27A and 27B, they describe the flow of process for an offline emergency device via an end device. It is the protocol for when the emergency is being propagated by the End Device. The deciding factor between cases mentioned previously with End Device and Helper Device is which one that receives the emergency the fastest. The process is performed according to operations S2701 to S2723.

Figure 28:
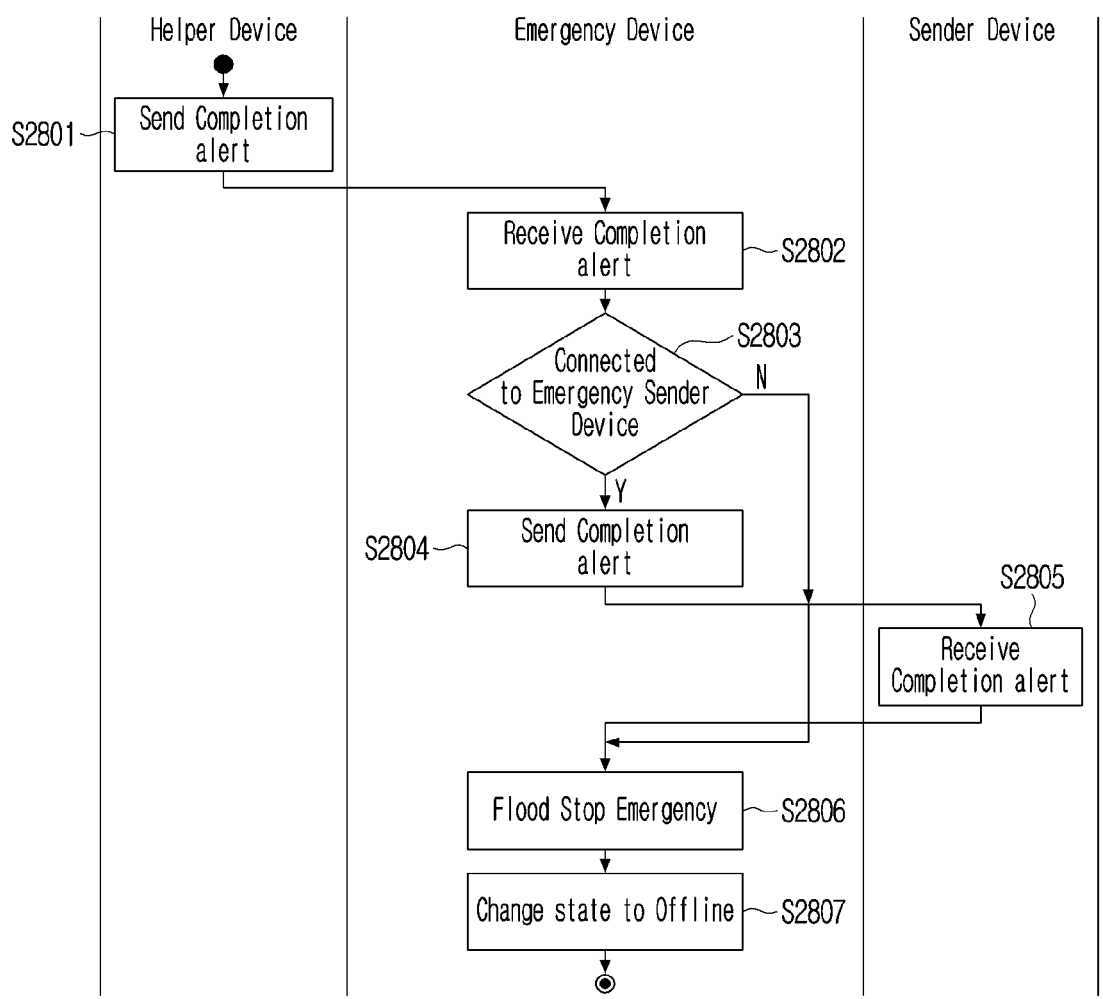
FIG. 28 is a process flow for stopping an emergency device via a sender alert according to an embodiment of the disclosure.

FIG. 28 is a process flow for stopping an emergency device via a sender alert according to an embodiment of the disclosure.

Figure 29:
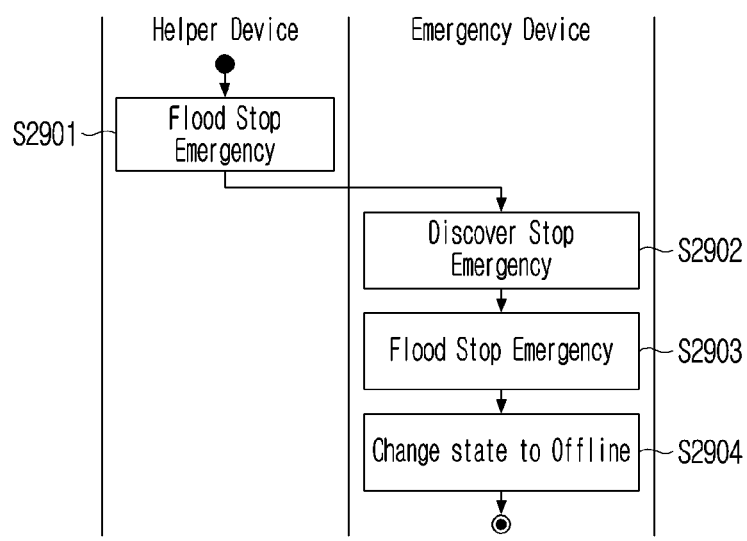
FIG. 29 is a process flow for stopping an emergency device via a flood stop according to an embodiment of the disclosure.

FIG. 29 is a process flow for stopping an emergency device via a flood stop according to an embodiment of the disclosure.

Figure 30:
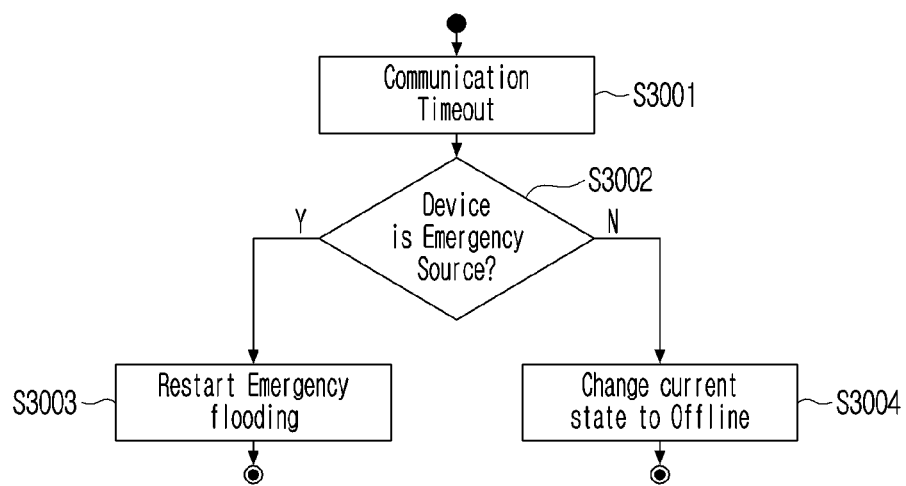
FIG. 30 is a process flow for stopping an emergency state via a timeout according to an embodiment of the disclosure.

FIG. 30 is a process flow for stopping an emergency state via a timeout according to an embodiment of the disclosure.

Referring to FIGS. 28 to 30, they describe the different format of Emergency state for the devices in mesh network. Referring to FIG. 28, operations S2801 to S2807 describe the flow of a process for stopping an emergency device via a sender alert. After the Emergency Device receives a completion alert from the Helper Device, it may check for the connected Emergency Sender Device. If it is connected with the Sender Device, the Emergency Device may call send completion alert to notify the Sender Device first, then call flood stop emergency and change a current state to offline. If it is not connected, the Emergency device may skip notify process, call flood stop emergency and change all devices on the path current state to offline. Meanwhile referring to FIG. 29, operations S2901 to S2804 describe the flow of process for stopping the emergency state for a device via Flood stop. After the Emergency Device discovers stop emergency from the Helper Device, call flood stop emergency and change all devices on the path current state to offline. Referring to FIG. 30, operations S3001 to S3004 describe a flow of process for stopping an emergency state for a device when a communication timeout happens. After receiving the timeout, the device checks itself if it is emergency source or not. If not, it may change current state to the offline state. If it is the emergency source, then it may call restart emergency flooding.

Figure 31:
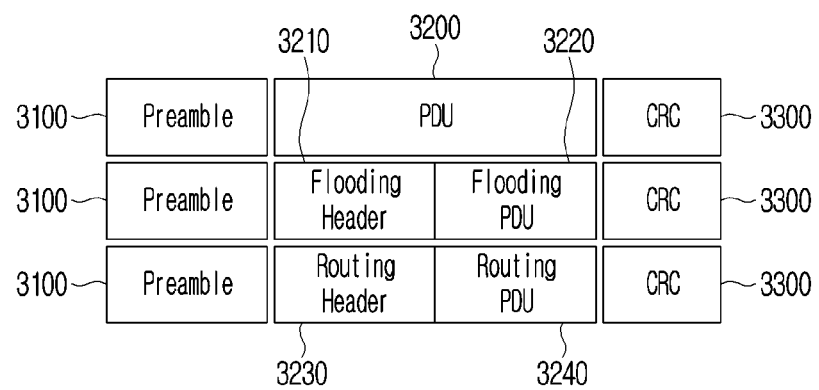
FIG. 31 is a block diagram of a packet format according to an embodiment of the disclosure.

FIG. 31 is a block diagram of a packet format according to an embodiment of the disclosure.

Referring to FIGS. 31 to 37, they describe different packet format block diagrams based on the protocol. To support this protocol properly, each transmission or data exchange process may use a predetermined packet format. Referring to FIG. 31, it describes the base packet format for all transmission process. The packet format contains several parts. The first part is preamble (3100), as introduction bytes for synchronizing the transmission timing. These bytes may help to identify the beginning of a transmission. When some transmissions receive the same continuous pattern, it assumes that data is a part of the protocol transmission. The second part is Protocol Data Unit (PDU) (3200). It is a block unit of bytes use for host the data transmission. On the Tag Emergency Protocol it may divide into 2 types, Flooding and Routing. A Flooding Header (3210) is bytes that contain default header for flooding tag transmission. A Flooding PDU (3220) is bytes that contain data used for the Tag Emergency Protocol related for a flooding tag transmission. A Routing Header (3230) is bytes that contain default header for a routing tag transmission. A Routing PDU (3240) is bytes that contain data used for the Tag Emergency Protocol related for routing tag transmission. The last part is the Cyclic Redundancy Check (CRC) (3300). This part is default bytes to validates the corrupted of data. As a type of checksum, this is a hash function that detects accidental changes of the packet data. For part of the PDU block, packet format may be divided into 6 more details, based on the protocol being used.

Figure 32:
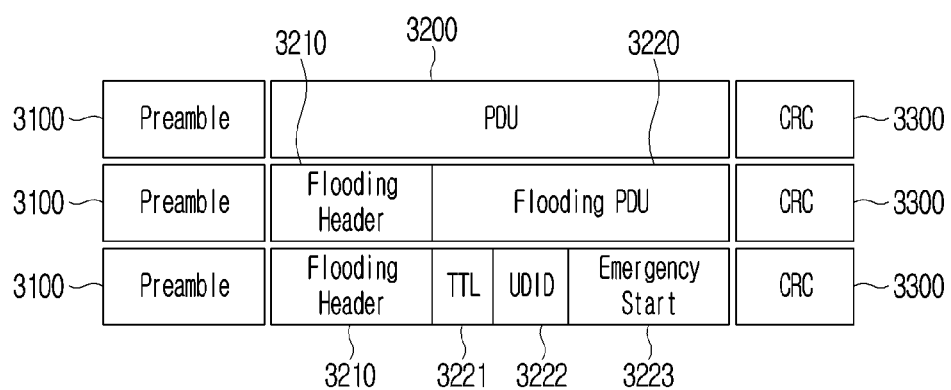
FIG. 32 is a block diagram of a packet format for an emergency start according to an embodiment of the disclosure.

FIG. 32 is a block diagram of a packet format for emergency start according to an embodiment of the disclosure.

The first packet format is based on a flooding protocol for an Emergency Start. Referring to FIG. 32, it describes the packet data format used at the beginning of the protocol. This packet format is used by source emergency tag to flood data on the mesh network, make helper tags followed to be an emergency tags, and propagate for building the path. It contains three items. The first is Time to Live (TTL) (3221), which is a counter for limits the lifetime of the data. The second is a Unique Device Identifier (UDID) (3222), an identification of source emergency tag that is registered on the cloud server. Last is the emergency start (3223), a flag to indicate an emergency state transmission part.

Figure 33:
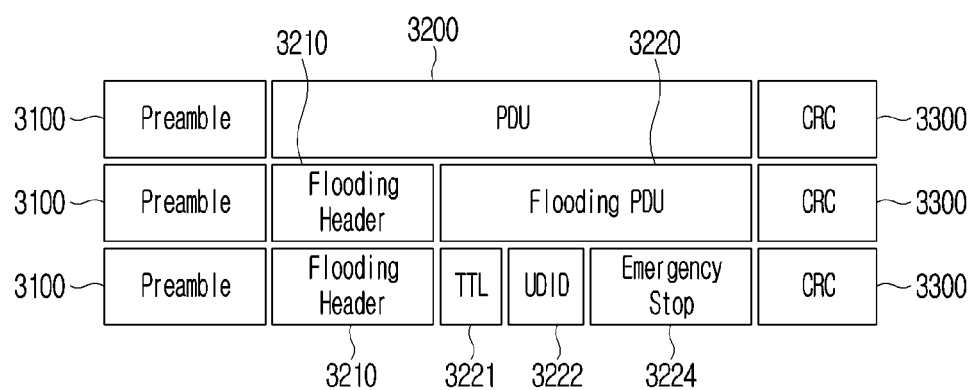
FIG. 33 is a block diagram of a packet format for emergency stop according to an embodiment of the disclosure.

FIG. 33 is a block diagram of a packet format for emergency stop according to an embodiment of the disclosure.

The second packet format is based on a flooding protocol for an Emergency Stop. Referring to FIG. 33, describes the packet data format used at the end of protocol. This packet format is used by connected tag to flood data on the mesh network; make emergency tags, including source, back to helper tags. It contains three items, which are a TTL (3221), a UDID (3222), and an Emergency Stop (3224) as a flag to indicate that it is no longer on emergency state.

Figure 34:
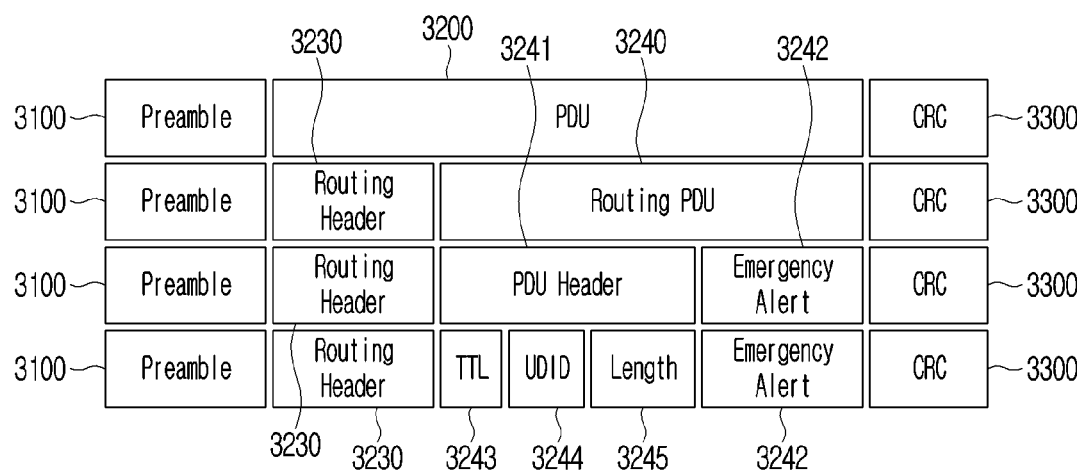
FIG. 34 is a block diagram of a packet format for sending an emergency alert according to an embodiment of the disclosure.

FIG. 34 is a block diagram of a packet format for sending an emergency alert according to an embodiment of the disclosure.

The third packet format is based on routing protocol for Send Emergency Alert. Referring to FIG. 34, describes the packet format used at a Send Request Emergency Alert part. This format used by a connected tag to tell the source tag that path has been formed and start to send the emergency message. The UDID (3244) on the PDU Header (3241) use for identify uniqueness of the data so it may not have mixed up with other transmission. The Emergency Alert block (3242) after a PDU Header (3241) is the bytes of the Emergency Alert data. The packet format contains four items, which are a TTL (3243), a UDID (3244), a length (3245) and an Emergency Alert block (3242). Length is the total length of the alert message, while Emergency Alert is the message that is distributed to tell emergency tag to send the emergency message.

Figure 35:
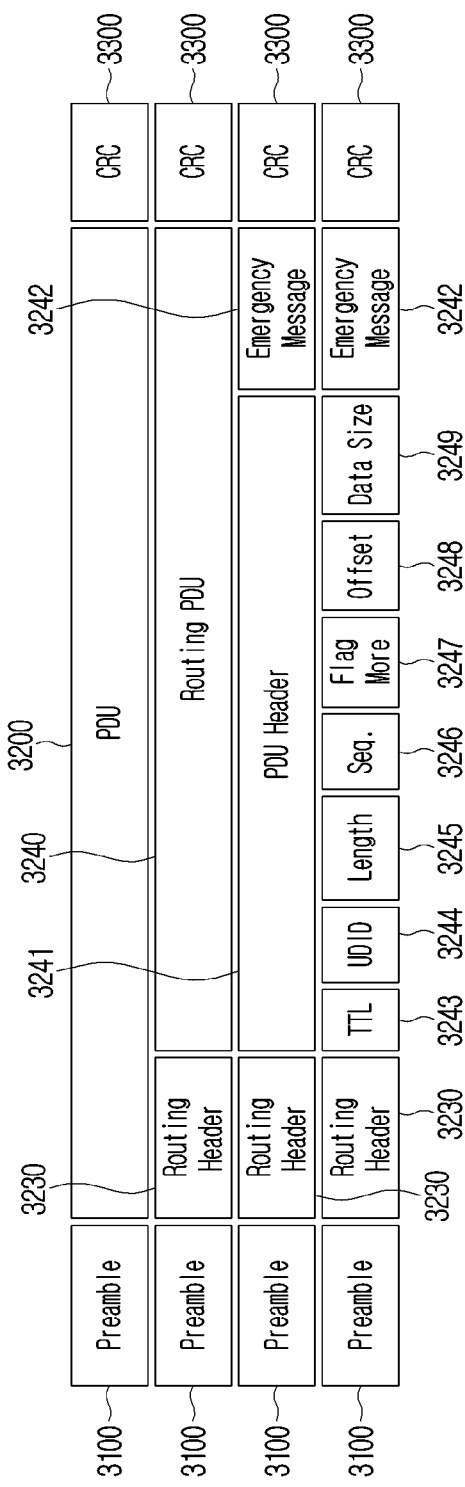
FIG. 35 is a block diagram of a packet format for sending an emergency message according to an embodiment of the disclosure.

FIG. 35 is a block diagram of a packet format for sending an emergency message according to an embodiment of the disclosure.

The fourth packet format is based on routing protocol for Send Emergency Message. Referring to FIG. 35, describes the packet format used by a source emergency tag to send the emergency message via a formed path to a connected tag. In this packet data format, Flag more, Offset and Data size bytes used for chunk data feature support. The UDID (3222) on PDU Header (3241) use for identify uniqueness of the data so it may not have mixed up with another transmission. An Emergency Message block after the PDU Header (3241) is the bytes of the Emergency Message data. There are 8 items in the packet format, including a TTL (3243), a UDID (3244), and a Length (3245). A Seq (3246) is the sequence number of emergency message chunk. A Flag more (3247) indicates there is still more data in next chunk, flag "1" when it still have more data chunk and "0" if there is no next data chunk. An Offset (3248) is the offset byte of chunk for data reassemble, based on the original data payload. "0" indicates the first chunk for start. Data size (3249) is the size of the emergency message, only for each chunked data. Last, Emergency Message is the chunk bytes data of emergency message.

Figure 36:
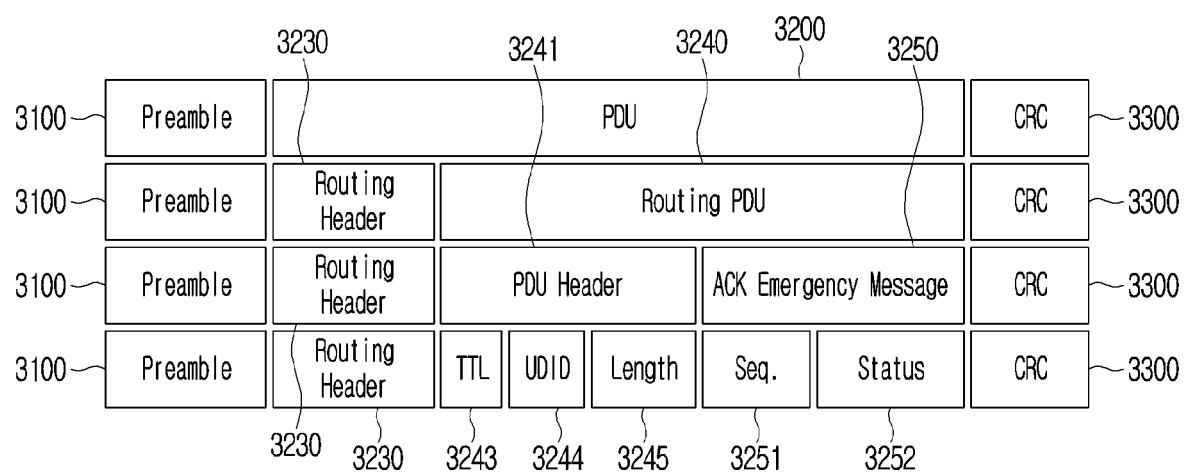
FIG. 36 is a block diagram of a packet format for an acknowledged emergency message according to an embodiment of the disclosure.

FIG. 36 is a block diagram of a packet format for acknowledge emergency message according to an embodiment of the disclosure.

The fifth packet format is based on routing protocol for an Acknowledge of Send Emergency Message. Referring to FIG. 36, it describes the packet format used by a connected tag as an Acknowledge Emergency Message (ACK Emergency Message) (3250) to tell the source tag that it already received the emergency message and to request if there is any next chunk message. The packet format contains a TTL (3243), a UDID (3244), a Length (3245), a Seq (3251), and a Status (3252) to indicate status delivered of the chunk message.

Figure 37:
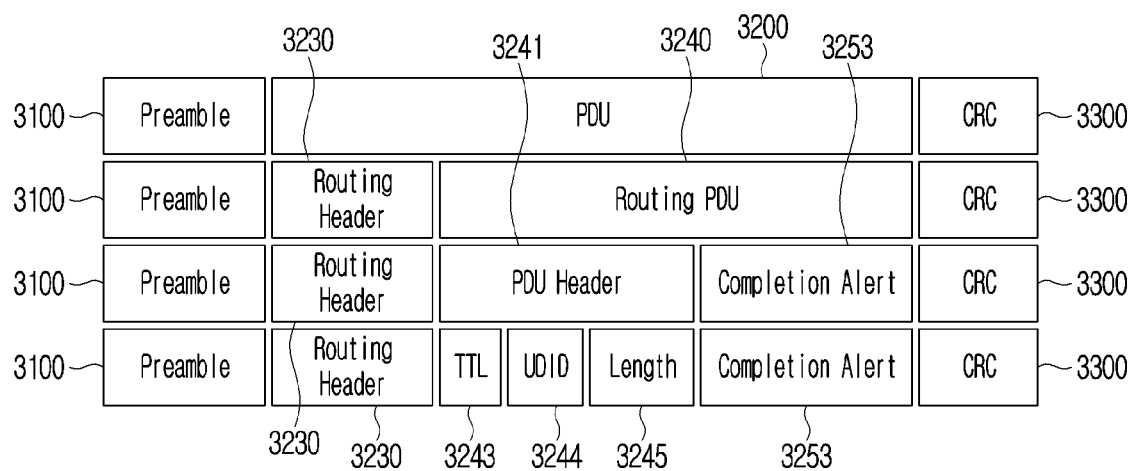
FIG. 37 is a block diagram of a packet format for a completion alert according to an embodiment of the disclosure.

FIG. 37 is a block diagram of a packet format for a completion alert according to an embodiment of the disclosure.

The sixth packet format is based on a routing protocol for a Send Completion Alert. Referring to FIG. 37, describes the packet format used by a connected tag as a Completion Alert to tell the source tag that the emergency message has been delivered to cloud server by end device. The packet format contains a TTL (3243), a UDID (3244), a Length (3245) and a Completion Alert (3253). The Completion Alert contains the message to tell emergency tag that emergency message has been delivered to cloud server.

Figure 38:
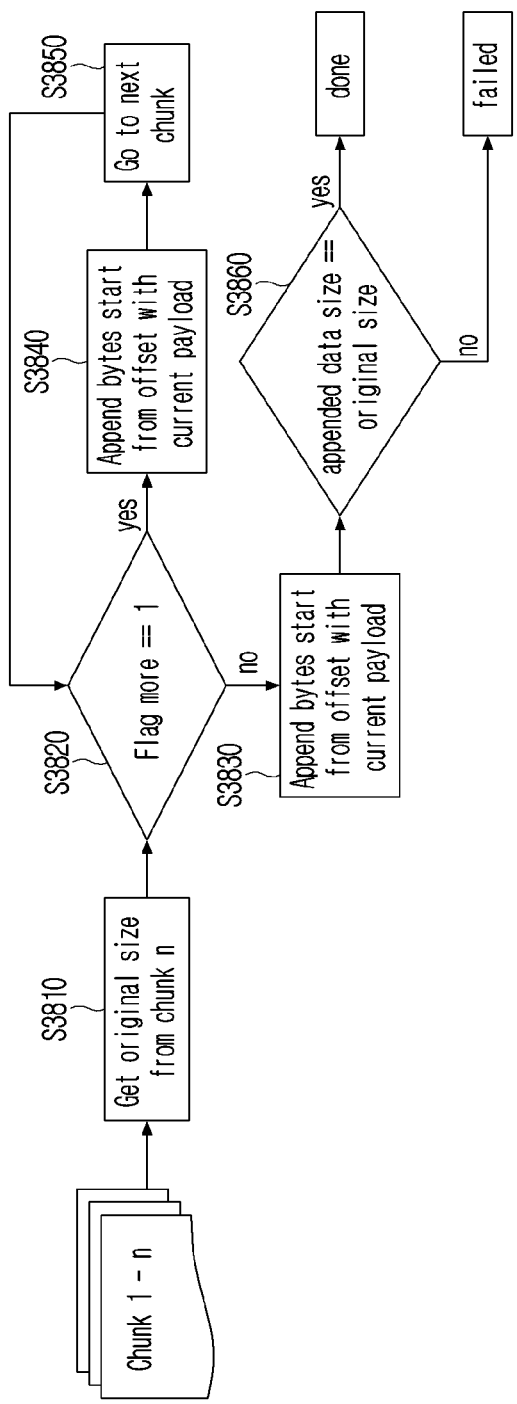
FIG. 38 is a flowchart of reassembling an emergency message chunk according to an embodiment of the disclosure.

FIG. 38 is a flowchart of reassembling an emergency message chunk according to an embodiment of the disclosure.

Referring to FIG. 38, in operations S3810 to S3860 describe the flow of a process for reassembling an emergency message chunk. The emergency message has a format to support the chunk data. Before sending it to the cloud server, the chunk data needs to be reassembled as a single message. The first operation is to collect the chunk data that has the same UDID, and also make sure the chunk data is having the same UDID to avoid sending the wrong data when it is mixed with other. The second operation is to calculate the original data payload size from the last chunk data. The Offset and Data size represent the original data payload size. The third operation is to reassemble, or append, the data using both the chunk "offset" and the "flag more". Offset is used to indicate start position of bytes to be appended. Flag more is used to check the end of appending data process. The process may stop until the receiver receives the last chunk, which has the "flag more" labeled as "0". The last operation is to compare size of appended data with the calculated original data payload size. If the size is same at operation S3860-Y, the process was correct; but if the size is different at operation S3860-N, the process failed and need to do some action, such as retransmitting the data.

Figure 39:
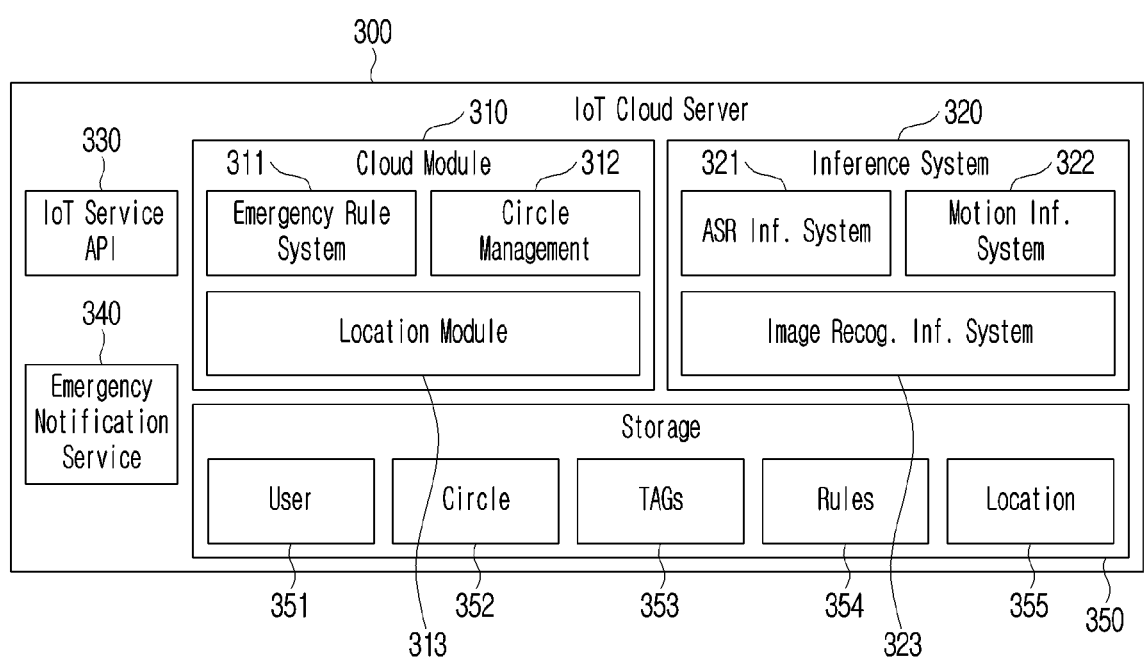
FIG. 39 is an overview of an IoT cloud server according to an embodiment of the disclosure.

FIG. 39 is an overview of an IoT cloud server according to an embodiment of the disclosure.

Figure 40:
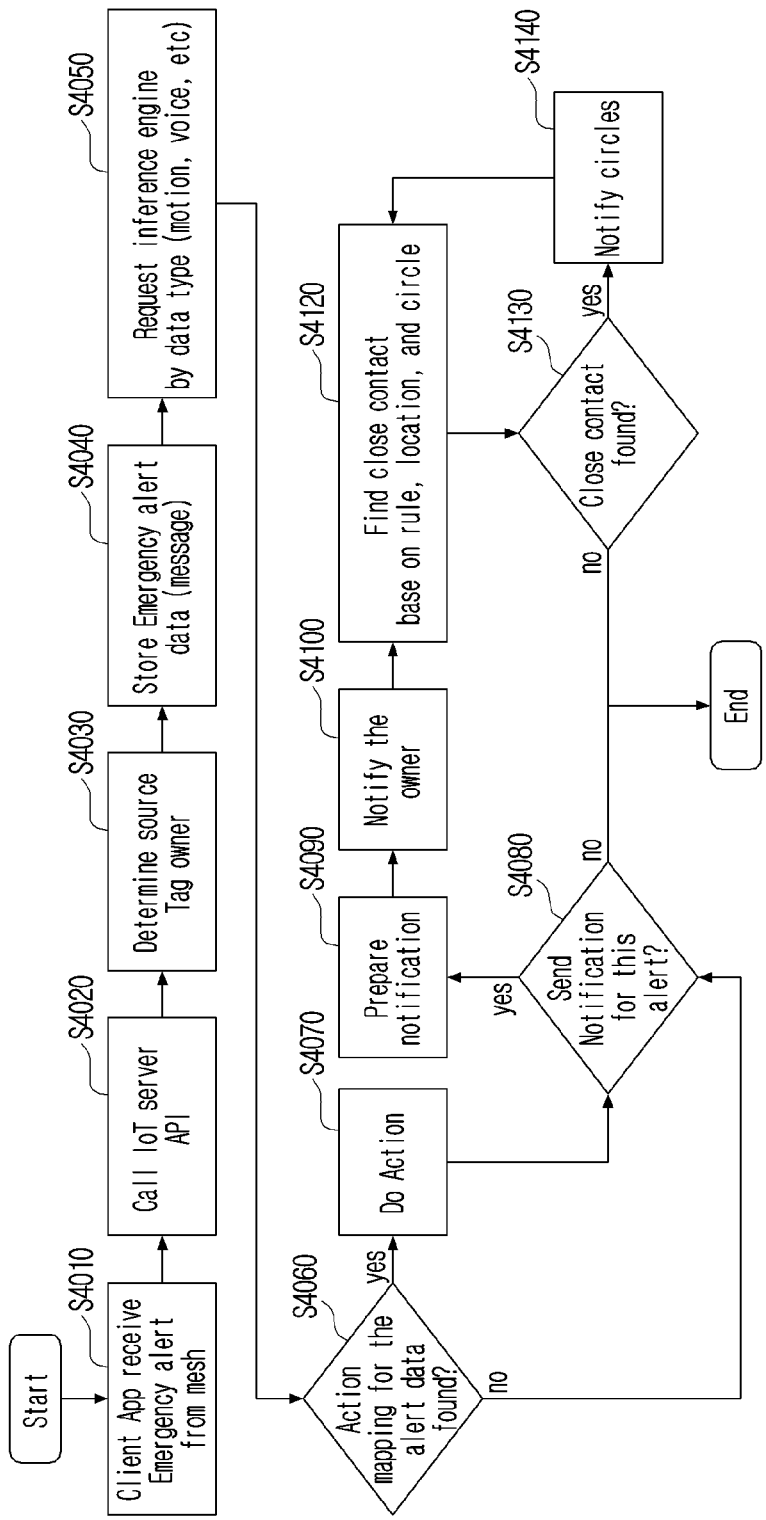
FIG. 40 is a flowchart of emergency notification process according to an embodiment of the disclosure.

FIG. 40 is a flowchart of an emergency notification process according to an embodiment of the disclosure.

Referring to FIGS. 39 and 40, they describe the cloud modules. The IoT cloud server helps in handling request, storing data, analyzing data from IoT App, and also broadcasting notification to the Tag owner and circle. Referring to FIG. 39, describes the overview of the IoT cloud server. The IoT cloud service consists of an IoT service API (330), a cloud module (310), an inference system (320), storage (350), and an Emergency Notification Service (340). Conventional components, like security mechanisms, load balancers and the like are not shown to not distract the detail of the IoT cloud server architecture.

The IoT server API is used as an interface for an external system to interact with the IoT Cloud server, thus enabling the IoT app to access information from the IoT cloud server. The information provided by the IoT cloud server may include an alert message and location in the form of a notification alert.

Referring to FIG. 40, it describes the flowchart to illustrate the processing of an alert to create notification in operations 54010 to 54140. First, the IoT App detects that Tag's button is triggered or receive button triggered command from mesh at operation 54010. IoT App may then send API request to IoT cloud server via network at operation 54020. The API request is received by IoT service API. The IoT service API may then call other module to process the request and determine the appropriate response, which is sent back to the IoT App as emergency notification.

The cloud module (310) may process request data from service API. This module has three submodules based on the data that it needs to process. The first submodule is Emergency Rules System (311), to manage map data, called rule. The rule is map data that contains connection between a Tag capability, an alert type, and a circle contact set by a Tag owner. The second submodule is the Circle Management module (312), to manage circle of contact set by the Tag owner. The third submodule is Location Module (313), to manage the Tag location data. The location data contains last location data from the Tag. When user is doing the Tag onboarding, the user may send a request through the API via the network. This request may at least contain collection data of a rule, a contact circle, an alert type and a location. This request is then received by the service API. Service API may then call the Cloud module and the Circle Management. Cloud module may process the rule and save rule to storage, while the Circle management may process collection contact data and save to the storage. For location data, IoT app may update latest location data when the IoT App detects that the Tag's capability is triggered, e.g., button, mic, gyroscope. The IoT App may update the Tag location data in the IoT Cloud Server through the API. The Service API may receive the request and call location module to process and store the data to the storage (350). Later on, the location data may be used by the API when compiling the notification message for the emergency notification.

The IoT cloud server (300) also includes an inference system (320). The inference system (320) may access the storage (350) and interact with cloud module (310) to infer reasons explaining the emergency flag. The inference system (320) has three submodules based on data. The first submodule is an Automatic Speech Recognition (ASR) inference system (321), to process requests containing a voice or speech data. The second submodule is a Motion inference system (322), to process requests containing data from motion sensor, such as a gyrometer. The third submodule is Image recognition inference system (323), to process requests containing image data. The inference system (320) may process request data and check for matching an emergency pattern. When an emergency pattern is found, the inference module may then set a flag to this request data, save it to the storage (350) and notify the cloud module (310).

The IoT cloud server (300) includes storage (350) to store data. The storage (350) contains data about a Tag device user (351), a circle contact (352), rules (454), a Tag capability (353) and location data (355). And, the last module is the Emergency Notification Service (340). The IoT cloud server uses emergency notification service to send alert message to the circle. The circle data may be accessed through circle management and it contains collection of contact data. The emergency notification may send notification that contains information about alert message and the latest Tag location.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A system for delivering an emergency alert, the system comprising:
    a plurality of tag devices, each tag device comprising:
        a modular sensor stack comprising a configuration of modular sensors embedded in each tag device to support different types of sensor modules, and
        a processor configured to execute a wireless communication protocol, the wireless communication protocol comprising an extension to an existing protocol to trigger the emergency alert and activate an emergency mode, wherein the wireless communication protocol is configured to propagate the emergency alert to other tag devices of the plurality of tag devices proximal to the tag device;
    an internet of things (IoT) client device configured to manage the plurality of tag devices and other devices using an application configured to:

allow users to register and onboard the plurality of tag devices, and create a group of trusted recipients of the emergency alert, and provide a system to set and manage rules for the emergency alert and the group of trusted recipients; and an IoT cloud server configured to:

handle requests, store data, analyze the data, and broadcast a notification to a tag owner and the tag devices in the group of trusted recipients.

2. The system of claim 1, wherein, to manage the plurality of tag devices and the other devices, the IoT client device is further configured to:

perform device pairing and recognition as an onboarding process for user-device pairing process, and sensor capability recognition process, wherein the user-device pairing process defines which user uses the plurality of tag devices and the other devices, wherein the sensor capability recognition process recognizes a device type that is currently onboard on an application, including which sensor a tag device has and capabilities of the tag device; and initiate rules and close friend settings to add contacts as alert receivers, the user choosing and adding contacts as close friends in a circle, from an IoT client device application, the IoT client device application prompting a request for installing the IoT client device application when selected contacts are not registered to a service.

3. The system of claim 2, wherein the system, to set and manage rules for the emergency alert and the group of trusted recipients, is configured to:

set rules and close friend settings to create a parameter of when an emergency is happening and whom to contact, the system sending data to a list of previously selected recipients, and called close friends, the user choosing or adding contacts as close friends from a source, and send the selected contacts to the IoT cloud server, and wherein, if a selected contact is not registered, the IoT cloud server is configured to:

send a message to the selected contact to prompt IoT client device application installation, the IoT client device application sends an approval request to the selected contacts to be added into a tag owner's close friends group, and verify ownership by using a specific sensor module in a particular tag device of the plurality of tag devices.

4. The system of claim 1, further comprising:

sensor modules comprising hardware sensors, a type identifier (ID) sensors, analog to digital converters (ADCs) and codecs that are used to complement analog data of sensor hardware;

a sensor bridge interface the sensor bridge interface configured to identify a sensor type of an installed module by identifying a sensor type ID that is in the sensor module; and a sensor registry configured to store information for performing communication with a specific sensor module attached on the sensor bridge interface.

5. The system of claim 4, wherein the modular sensor stack is configured to:

identify types of modular sensors, the tag devices supporting different types of sensor modules, the sensor modules comprising G sensors, a microphone, or an accelerometers; and provide a universal interface between the different types of sensor modules and an application layer.

6. The system of claim 1, wherein the system is configured to use the wireless communication protocol to:

operate within a wireless mesh network, wherein the wireless mesh network aids connectivity in a condition where two nodes that need to exchange data aren't directly connected, by broadcasting a packet and use the other nodes to help relaying the data; and operate within a tag emergency protocol, wherein the tag emergency protocol helping propagate an alert in less than ideal network conditions.

7. The system of claim 6, wherein; the system is configured to use the wireless communication protocol to propagate an emergency alert and aid connectivity when there are offline devices, the system by:

forming a mesh like network structure that is created around an emergency tag device to solve connectivity issues happening in the emergency alert system;

propagating an alert message in situations when network conditions are not ideal by utilizing the mesh network, the tag emergency protocol dictating device behavior and configuring network packets in a protocol for an emergency situation involving the tag devices and applicable on top of a network communication stack; and applying flooding and routing mechanisms to enable an emergency state of helper devices, and control when the system should enter the emergency state or stop.

8. The system of claim 1, wherein the system applies IoT cloud service to manage requests, data and notifications to a tag owner and circle, and comprises:

an IoT service application programming interface (API), the IoT service API interacting with an IoT cloud service, thus enabling the IoT client app to access information from the IoT cloud service, the information provided by the IoT cloud service including an alert message and location in a form of a notification alert;

a cloud module the cloud module processing request data from the IoT service API, the cloud module containing an emergency rules to manage map data, a circle management to manage the group of contacts set by the owner, and a location module to manage Tag location data;

an inference system, the inference system accessing a storage and interacting with the cloud module to infer reasons for explaining the emergency flag;

the storage storing data of a Tag user, a circle contact, rules, a Tag capability and location data; and an emergency notification service, the emergency notification service sending an alert message to the circle containing information about the alert message and a latest Tag location.

9. The system of claim 8, wherein the cloud module manages map data, circle and location data, and wherein the system is configured to:

send a request through an API via a network when an onboarding process is running, the request contains at least collection data of a rule, a contact circle, an alert type and location;

run an emergency rules system to process rules and save the rules to storage, the rule is map data that contains a connection between a tag capability, an alert type, and a circle contact set by a tag owner;

call circle management to manage a circle of a contact set by the tag owner; and use a location module to manage the tag location data, containing last location data from the tag device.

10. An electronic device for transmitting an alert received from a tag device in a mesh network, the electronic device comprising:

memory storing one or more computer programs; and at least one processor communicatively coupled to memory, wherein the one or more computer programs include computer-executable instructions that, when executed by the at least one processor individually or collectively, cause the electronic device to:

register and onboard a plurality of tag devices and a plurality of electronic devices, the registration of the plurality of electronic devices creating a group of trusted recipients of the alert from the tag device in the mesh network, set and manage rules for an emergency alert and the group of trusted recipients, receiving the alert from the tag device, the alert including a configuration of modular sensors in the plurality of electronic devices, the modular sensors being embedded in a tag device to support different types of sensor modules, trigger the emergency alert and an activate emergency mode in the mesh network using a wireless communication protocol comprising an extension to an existing protocol, the wireless communication protocol being configured to propagate the emergency alert to other devices the plurality of electronic devices found in proximity to the electronic device, and transmit the alert to an internet of things (IoT) cloud server via the mesh network, and wherein the IoT cloud server is configured to handle requests, store data, analyze the data, and broadcast a notification to an owner of the tag device and the plurality of electronic devices in the group of trusted recipients.

11. The electronic device of claim 10, wherein the one or more computer programs further include computer-executable instructions that, when executed by the at least one processor individually or collectively, cause the electronic device to:

perform device pairing and recognition as an onboarding process for user-device pairing and sensor capability recognition, the user-device pairing process defining which user uses the tag device and other devices of the plurality of electronic devices, the sensor capability recognition recognizing a device type that is currently onboard, including which sensor the tag device has and a tag device's capabilities; and initiate rules and close friend settings to add contacts as alert receivers, the user choosing and adding contacts as close friends in a circle from an IoT client app, the IoT client app prompting a request for installing the IoT client app when selected contacts are not registered to a service.

12. The electronic device of claim 11, wherein the one or more computer programs further include computer-executable instructions that, when executed by the at least one processor individually or collectively, cause the electronic device to:

set rules and close friend settings to create a parameter of when the alert is happening and whom to contact and send data to the group of trusted recipients of the alert from the tag device in the mesh network, the user choosing or adding contacts as close friends from a source;

send the selected contacts to the IoT cloud server, if a selected contact is not registered, the IoT cloud server sending a message to the selected contact to prompt an IoT client app installation in order to receive the alert, the IoT client app sending an approval request to an electronic device of the selected contacts to be added into a tag owner's close friends group; or physically verify ownership by using a specific sensor module in a certain tag device.

* * * * *